US010776653B2

(12) United States Patent
Gal-Yam et al.

(10) Patent No.: US 10,776,653 B2
(45) Date of Patent: Sep. 15, 2020

(54) DETECTION OF POINT SOURCES WITH VARIABLE EMISSION INTENSITY IN SEQUENCES OF IMAGES WITH DIFFERENT POINT SPREAD FUNCTIONS

(71) Applicant: YEDA RESEARCH AND DEVELOPMENT CO. LTD., Rehovot (IL)

(72) Inventors: Avishay Gal-Yam, Rehovot (IL); Barak Zackay, Rehovot (IL); Eran Ofek, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 126 days.

(21) Appl. No.: 15/751,188

(22) PCT Filed: Aug. 11, 2016

(86) PCT No.: PCT/IL2016/050880
§ 371 (c)(1),
(2) Date: Feb. 8, 2018

(87) PCT Pub. No.: WO2017/025970
PCT Pub. Date: Feb. 16, 2017

(65) Prior Publication Data
US 2018/0232596 A1 Aug. 16, 2018

(30) Foreign Application Priority Data
Aug. 12, 2015 (IL) .......................................... 240545

(51) Int. Cl.
*G06K 9/46* (2006.01)
*G06T 7/254* (2017.01)
(Continued)

(52) U.S. Cl.
CPC ......... *G06K 9/4609* (2013.01); *G06K 9/0051* (2013.01); *G06K 9/2018* (2013.01); *G06K 9/40* (2013.01); *G06T 7/254* (2017.01)

(58) Field of Classification Search
CPC ............ G02B 7/183; G06T 5/002; G06T 5/50
See application file for complete search history.

(56) References Cited

U.S. PATENT DOCUMENTS

2005/0114042 A1 5/2005 Pappin et al.
2005/0220292 A1 10/2005 Okumura et al.
(Continued)

FOREIGN PATENT DOCUMENTS

WO WO 2010093503 8/2010
WO WO 2012159012 11/2012

OTHER PUBLICATIONS

Gal-Yam et al., "The J-Band Light Curve of SN 2003Iw, Associated With GRB 031203," The Astrophysical Journal, 609: L59-L62, Jul. 10, 2004 (Year: 2004).*
(Continued)

*Primary Examiner* — Rosss Varndell
(74) *Attorney, Agent, or Firm* — Mark S. Cohen; Pearl Cohen Zedek Latzer Baratz LLP

(57) ABSTRACT

A System and a method for processing at least two M-dimensional data-measurements (DMs) of a physical-property for detecting one or more new-objects and/or a transition of one or more known-objects, in complex constant-background DMs, using at least one processor and at least one memory element, the method comprising: generating a filtered-new-DM by match-filtering a new-DM, respective to impulse response of a reference-DM; generating a filtered-reference-DM by match-filtering the reference-DM, respective to impulse response of the new-DM; generating an M-dimensional object-indicator (OI) by subtracting the filtered-reference-DM from the filtered-new-DM, or vice
(Continued)

versa; and generating an M-dimensional data score (DS) from the M-dimensional OI, where each of the scores is a probe for existence of an object at a specific M-dimensional location.

17 Claims, 12 Drawing Sheets

(51) Int. Cl.
    *G06K 9/00* (2006.01)
    *G06K 9/20* (2006.01)
    *G06K 9/40* (2006.01)

(56) References Cited

U.S. PATENT DOCUMENTS

| | | | |
|---|---|---|---|
| 2007/0274571 A1 | 11/2007 | Hamza | |
| 2011/0044524 A1 | 2/2011 | Wang et al. | |
| 2011/0243409 A1 | 10/2011 | Naimi et al. | |
| 2014/0015935 A1* | 1/2014 | Piestun | H04N 13/204 |
| | | | 348/46 |

OTHER PUBLICATIONS

Jiang et al., "The Sloan Digital Sky Survey Stripe 82 Imaging Data: Depth-Optimized Co-Adds Over 300 deg2 in Five Filters," The Astrophysical Journal Supplement Series, 213:12 (14pp), Jul. 2014 (Year: 2014).*
Abell, P. A., et al. (2009). *Lsst science book*, version 2.0 (No. SLAC-R-1031).
Alard, C. (2000). Image subtraction using a space-varying kernel. Astronomy and Astrophysics Supplement Series, 144(2), 363-370.
Alard, C., & Lupton, R. H. (1998). A method for optimal image subtraction. The Astrophysical Journal, 503(1), 325.
Annis, J., et al. (2014). The sloan digital sky survey coadd: 275 deg2 of deep sloan digital sky survey imaging on stripe 82. *The Astrophysical Journal*, 794(2), 120.
Arcavi, I., et al. (2011). SN 2011dh: discovery of a type IIb supernova from a compact progenitor in the nearby galaxy M51. The Astrophysical Journal Letters, 742(2), L18.
Baltay, C., et al. (2013). The La Silla-QUEST low redshift supernova survey. Publications of the Astronomical Society of the Pacific, 125(928), 683.
Becker, A. C., et al. (2012). Regularization techniques for PSF-matching kernels-I. Choice of kernel basis. Monthly Notices of the Royal Astronomical Society, 452(2), 1341-1349.
Bertin, E., & Arnouts, S. (1996). SExtractor: Software for source extraction. *Astronomy and Astrophysics Supplement Series*, 117(2), 393-404.
Bertin, E., et al. (2002). The TERAPIX pipeline. In *Astronomical Data Analysis Software and Systems XI* (vol. 281, p. 228).
Bloom, J. S., et al. (2012). Automating discovery and classification of transients and variable stars in the synoptic survey era. Publications of the Astronomical Society of the Pacific, 124(921), 1175.
Bramich, D. M. (2008). A new algorithm for difference image analysis. Monthly Notices of the Royal Astronomical Society: Letters, 386(1), L77-L81.
Bramich, D. M., et al. (2016). Difference image analysis: automatic kernel design using information criteria. Monthly Notices of the Royal Astronomical Society, 457(1), 542-574.
Cenko, S. B., et al. (2013). Discovery of a cosmological, relativistic outburst via its rapidly fading optical emission. The Astrophysical Journal, 769(2), 130.
Cenko, S. B., et al. (2015). iPTF14yb: the first discovery of a gamma-ray burst afterglow independent of a high-energy trigger. The Astrophysical Journal Letters, 803(2), L24.
Darnell, T., et al. (Sep. 2009). The Dark Energy Survey Data Management System: The Coaddition Pipeline and PSF Homogenization. In *Astronomical Data Analysis Software and Systems XVIII* (vol. 411, p. 18).

European Search Report of EP 16834774.8 dated Apr. 17, 2019.
Filippenko, A. V. (1982). The Importance of Atmospheric Differential Refraction in Spectrophotometry, Publications of the Astronomical Society of the Pacific, 94(560), 715.
Fisher, R. A. (1922). On the mathematical foundations of theoretical statistics. Philosophical Transactions of the Royal Society of London. Series A, Containing Papers of a Mathematical or Physical Character, 222(594-604), 309-368.
Gal-Yam, A., et al. (2008). Supernovae in Low-Redshift Galaxy Clusters: Observations by the Wise Observatory Optical Transient Search (WOOTS). The Astrophysical Journal, 680(1), 550.
Gal-Yam, A., et al. (2011). Real-time detection and rapid multiwavelength follow-up observations of a highly subluminous type II-P supernova from the Palomar Transient Factory survey, arXiv preprint arXiv:1106.0400.
Gal-Yam, A., et al. (2014). A Wolf-Rayet-like progenitor of SN 2013cu from spectral observations of a stellar wind. Nature, 509(7501), 471.
Garrel, V., et al. (2012). A highly efficient lucky imaging algorithm: Image synthesis based on fourier amplitude selection. Publications of the Astronomical Society of the Pacific, 124(918), 861.
Goldstein, D. A., et al. (2015). Automated transient identification in the Dark Energy Survey. The Astronomical Journal, 150(3), 82.
International Search Report and Written Opinion of PCT/IL2015/050441 dated Nov. 17, 2016.
Ivezić, Ž., et al. (2019). LSST: from science drivers to reference design and anticipated data products. The Astrophysical Journal, 873(2), 111.
Jiang, L., et al. (2014). The Sloan Digital Sky Survey Stripe 82 Imaging Data: Depth-optimized co-adds over 300 deg2 in five filters. The Astrophysical Journal Supplement Series, 213(1), 12.
Kaiser, N., et al. (Dec. 2002). Pan-STARRS: a large synoptic survey telescope array. In Survey and Other Telescope Technologies and Discoveries (vol. 4836, pp. 154-164). International Society for Optics and Photonics.
Karlin, S., & Rubin, H. (1956). The theory of decision procedures for distributions with monotone likelihood ratio. The Annals of Mathematical Statistics, 27(2), 272-299.
Laher, R. R., et al. (2014). IPAC image processing and data archiving for the Palomar Transient Factory. Publications of the Astronomical Society of the Pacific, 126(941), 674.
Law, N. M., et al. (2009). The Palomar Transient Factory: system overview, performance, and first results. Publications of the Astronomical Society of the Pacific, 121(886), 1395.
Lindegren, L. (1980). Atmospheric limitations of narrow-field optical astrometry. Astronomy and Astrophysics, 89, 41-47.
Medezinski, E., et al. (2013). CLASH: complete lensing analysis of the largest cosmic lens MACS J0717. 5+ 3745 and surrounding structures. *The Astrophysical Journal*, 777(1), 43.
Neyman, J., & Pearson, E. S. (1933). IX. On the problem of the most efficient tests of statistical hypotheses. Philosophical Transactions of the Royal Society of London. Series A, Containing Papers of a Mathematical or Physical Character, 231(694-706), 289-337.
Ofek, E. O et al. (2012). The Palomar Transient Factory photometric calibration. Publications of the Astronomical Society of the Pacific, 124(911), 62.
Ofek, E. O., et al. (2011). A very large array search for 5 GHz radio transients and variables at low galactic latitudes. The Astrophysical Journal, 740(2), 65.
Ofek, E. O., et al. (2014). Precursors prior to type IIn supernova explosions are common: precursor rates, properties, and correlations. The Astrophysical Journal, 789(2), 104.
Phillips, A. C., & Davis, L. E. (1995). Registering, PSF-matching and intensity-matching images in IRAF. In Astronomical Data Analysis Software and Systems IV (vol. 77, p. 297).
Pickles, A. J. (1998). A stellar spectral flux library: 1150-25000 Å. *Publications of the Astronomical Society of the Pacific*, 110(749), 863.
Rau, A., et al. (2009). Exploring the optical transient sky with the Palomar Transient Factory. Publications of the Astronomical Society of the Pacific, 121(886), 1334.

(56) References Cited

OTHER PUBLICATIONS

Riederer, S. J., et al. (1983). The technical characteristics of matched filtering in digital subtraction angiography. *Medical physics*, 10(2), 209-217.

Sevilla, I., et al. (2011). The Dark Energy Survey Data Management System. *arXiv preprint arXiv:1109.6741*.

Shao, M., & Colavita, M. M. (1992). Potential of long-baseline infrared interferometry for narrow-angle astrometry, Astronomy and Astrophysics, 262, 353-358.

Smith, A. M et al. (2011). Galaxy zoo supernovae. Monthly Notices of the Royal Astronomical Society, 412(2), 1309-1319.

Tody, D. (Oct. 1986). The IRAF data reduction and analysis system, In *Instrumentation in astronomy VI* (vol. 627, pp. 733-748), International Society for Optics and Photonics.

Van Dokkum, P. G. (2001). Cosmic-ray rejection by Laplacian edge detection. Publications of the Astronomical Society of the Pacific, 113(789), 1420.

Walter, C. W. (2015). The Brighter-Fatter and other sensor effects in CCD simulations for precision astronomy. Journal of Instrumentation, 10(05), C05015.

Wikipedia contributors. (Updated: Oct. 5, 2019).Sufficient statistic—Fisher-Neyman factorization theorem. In Wikipedia, The Free Encyclopedia. https://en.wikipedia.org/w/index.php?title=Sufficient_statistic&oldid=919786971.

Wright, D. E., et al. (2015). Machine learning for transient discovery in Pan-STARRS1 difference imaging. Monthly Notices of the Royal Astronomical Society, 449(1), 451-466.

Yuan, F., & Akerlof, C. W. (2008). Astronomical image subtraction by cross-convolution. The Astrophysical Journal, 677(1), 808.

Zackay, B., & Ofek, E. O. (2015). How to coadd images? I. Optimal source detection and photometry using ensembles of images. arXiv preprint arXiv:1512.06872.

Zackay, B., & Ofek, E. O. (2015). How to COAAD Images. II. A Coaddition Image that is Optimal for Any Purpose in the Background-dominated Noise Limit. arXiv preprint arXiv:1512.06879.

Zackay, B., Ofek, E. O., & Gal-Yam, A. (2016). Proper image subtraction—optimal transient detection, photometry, and hypothesis testing. *The Astrophysical Journal*, 830(1), 27.

Schechter, P. L., Mateo, M., & Saha, A. (1993). DOPHOT, a CCD photometry program: Description and tests. Publications of the Astronomical Society of the Pacific, 105(693), 1342.

\* cited by examiner

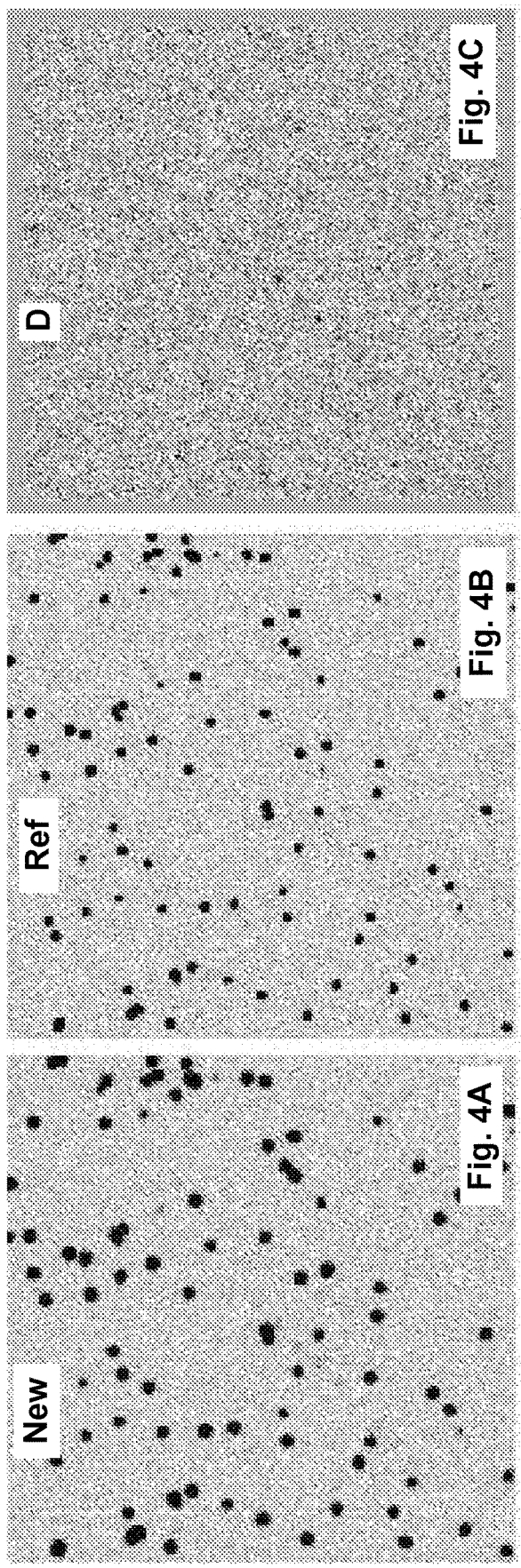
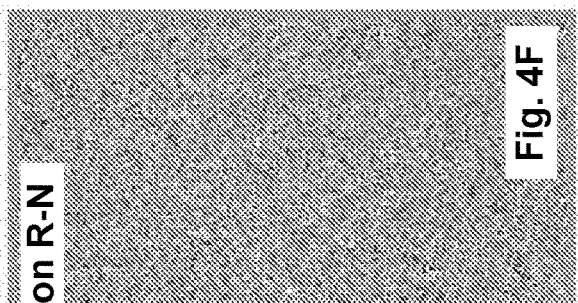
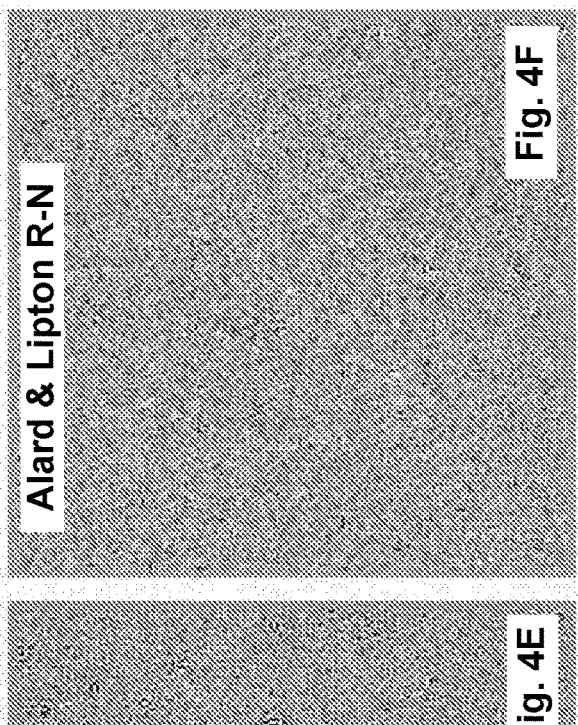
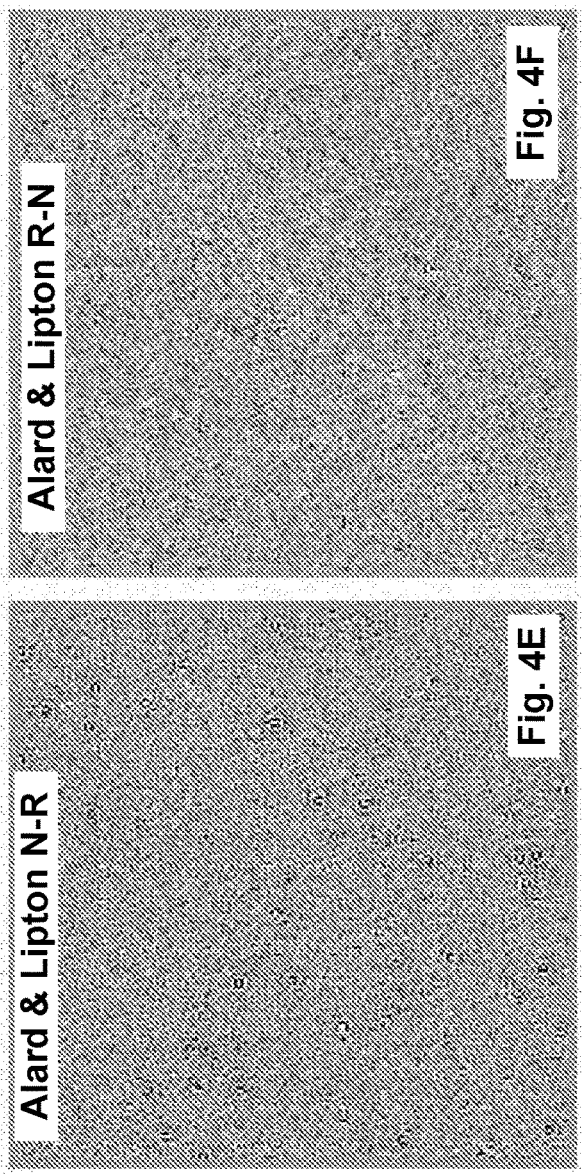
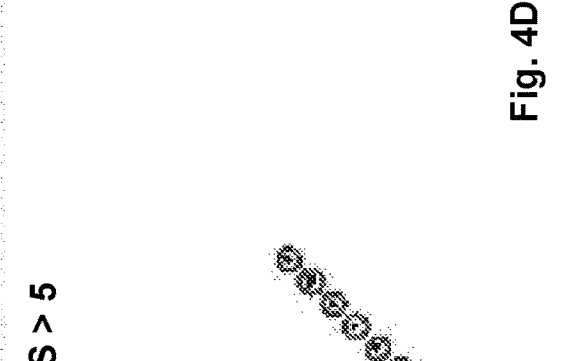
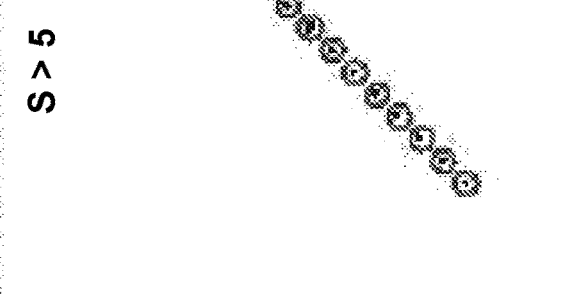
Fig. 4D

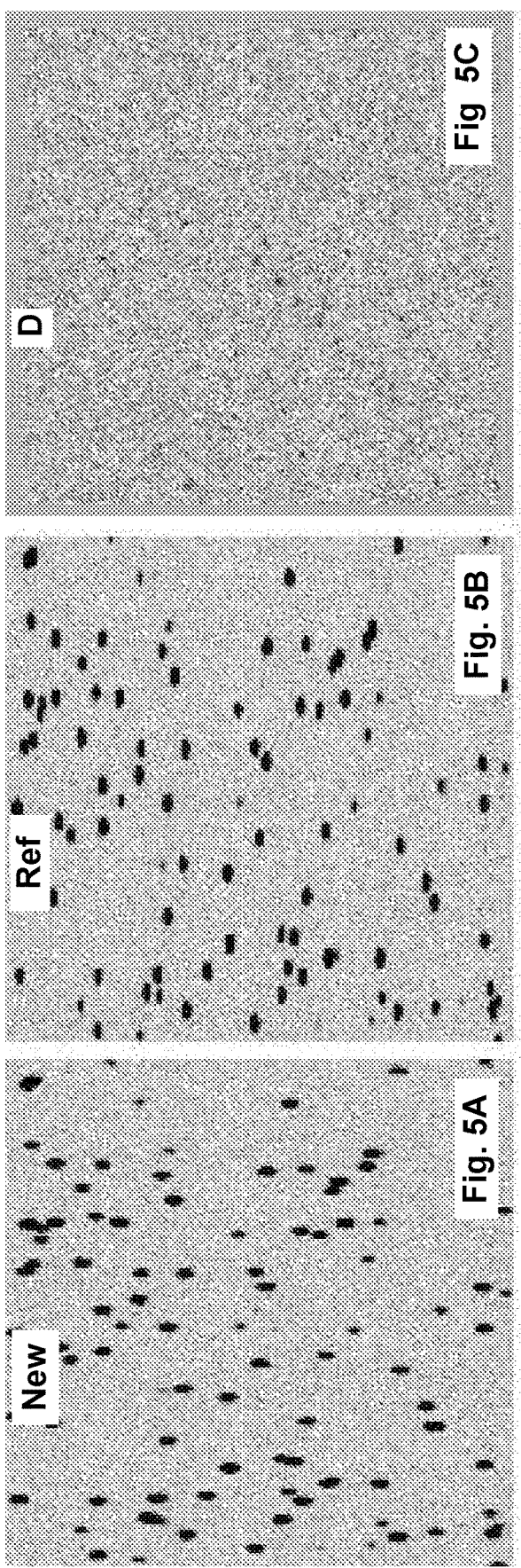
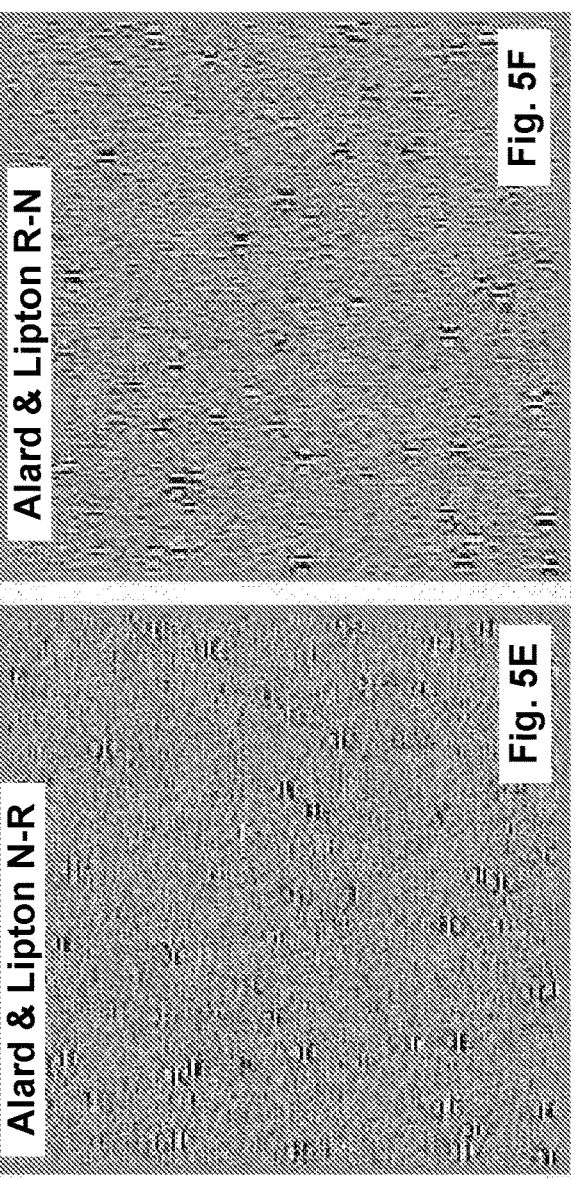
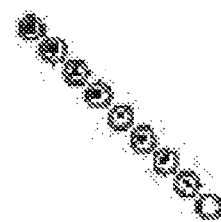
Fig. 5A  Fig. 5B  Fig. 5C
Fig. 5D  Fig. 5E  Fig. 5F

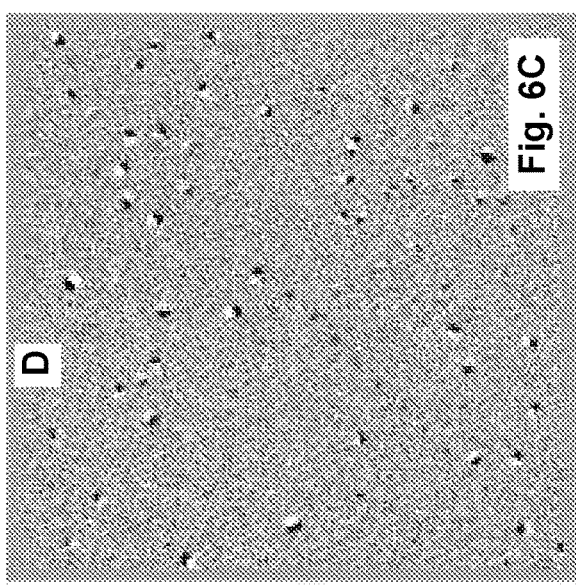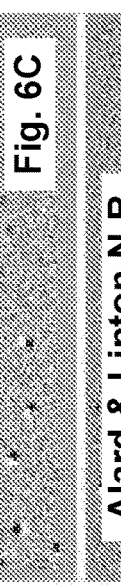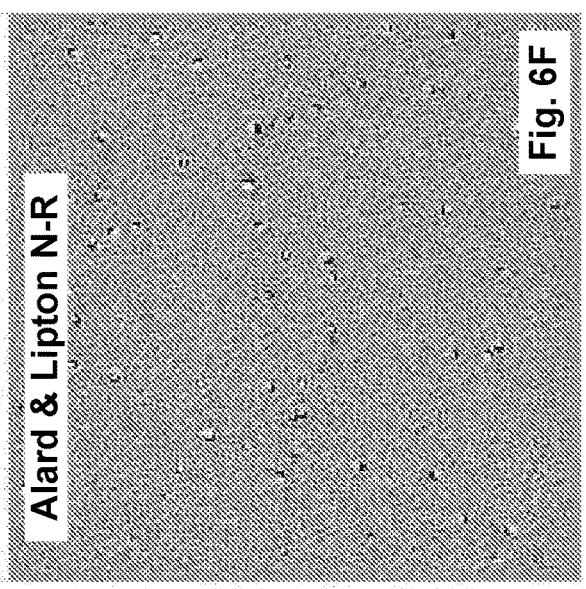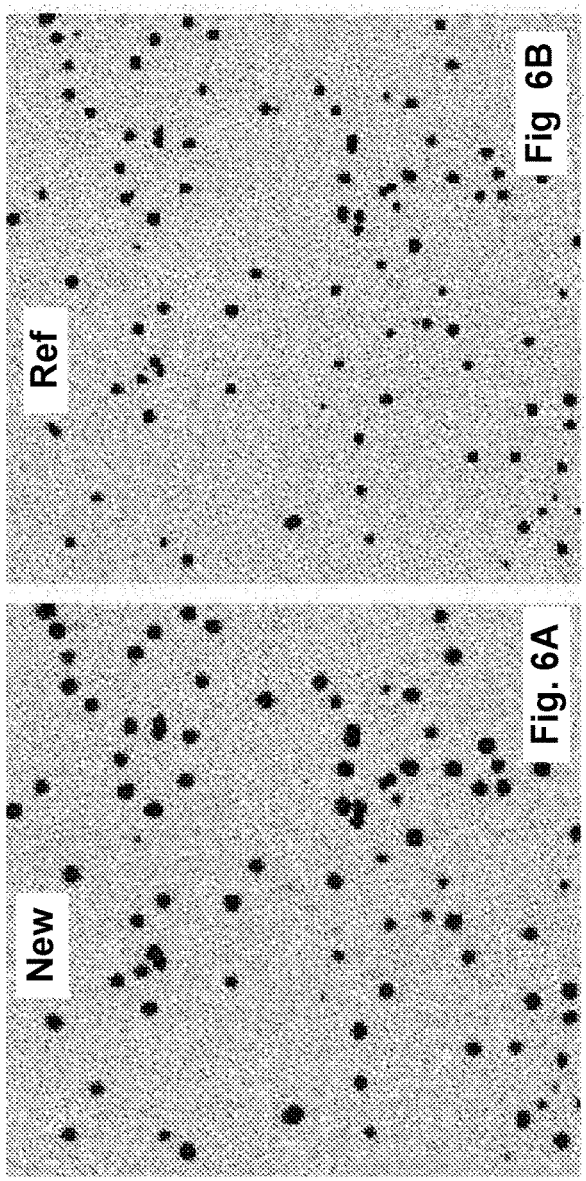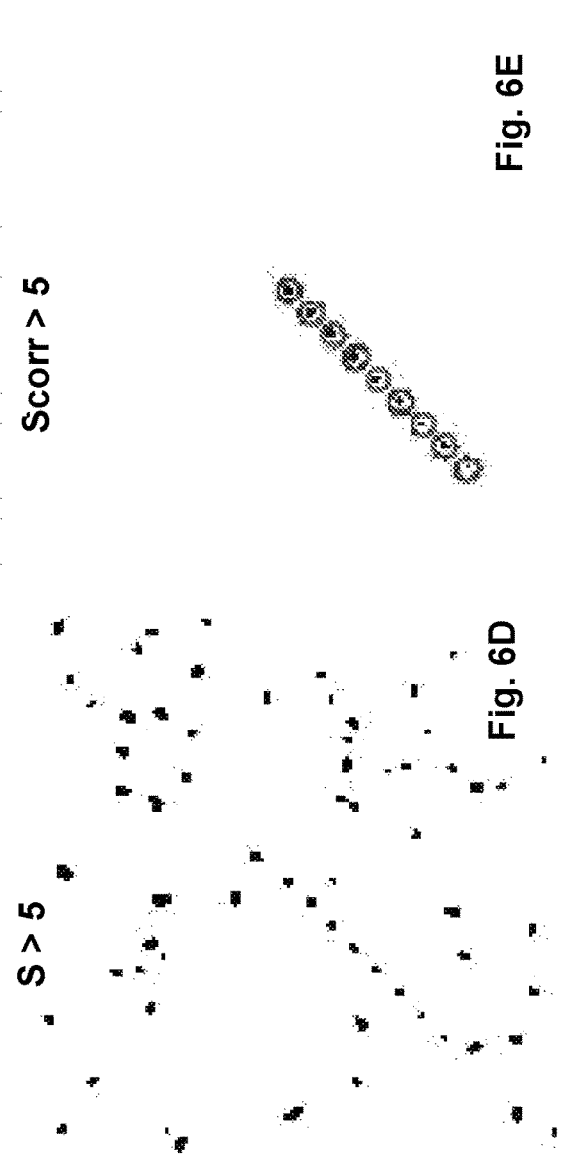

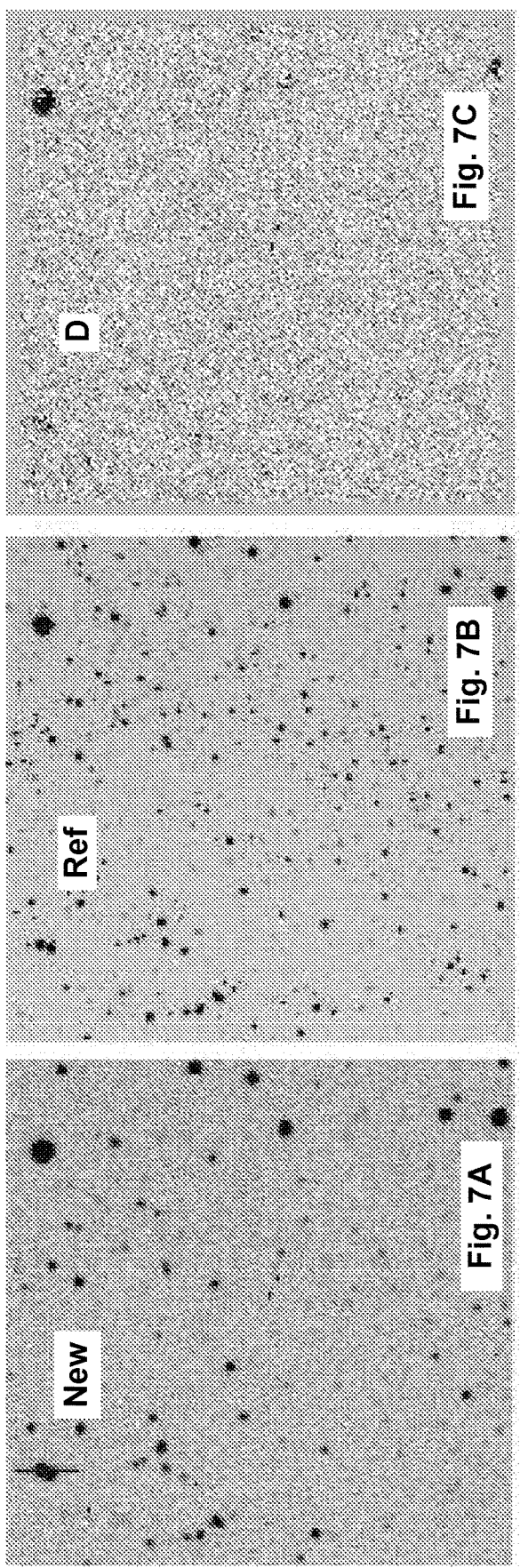
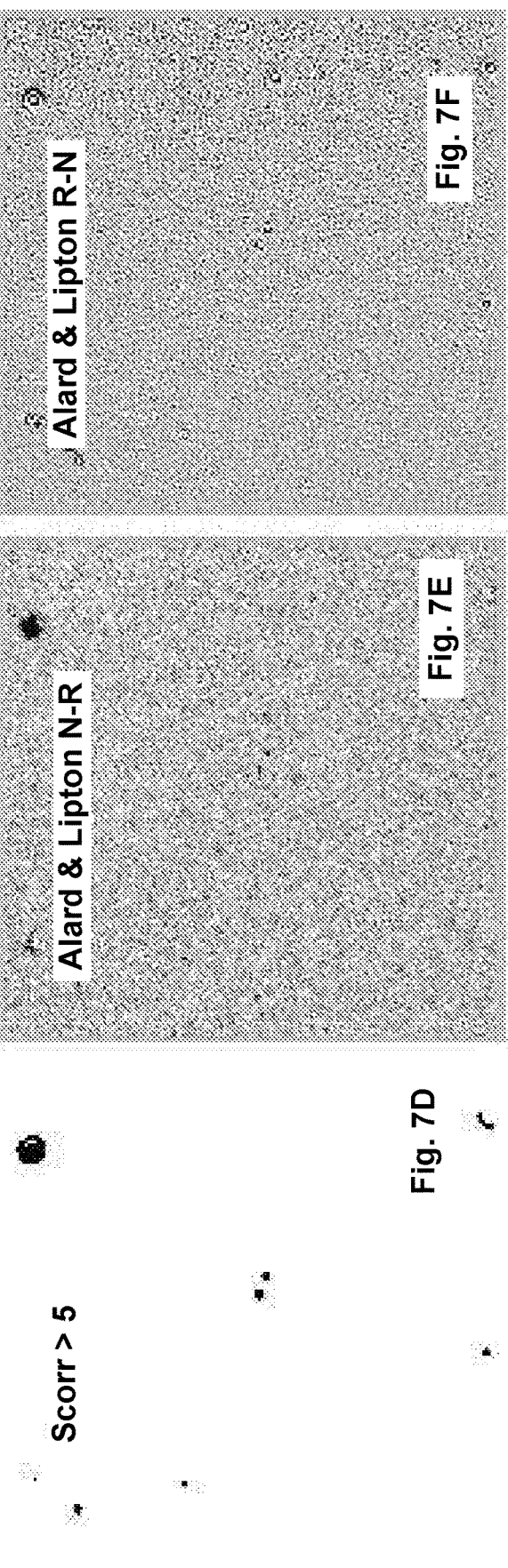

DETECTION OF POINT SOURCES WITH VARIABLE EMISSION INTENSITY IN SEQUENCES OF IMAGES WITH DIFFERENT POINT SPREAD FUNCTIONS

CROSS-REFERENCE TO RELATED APPLICATIONS

This application is a National Phase Application of PCT International Application No. PCT/IL2016/050880, International Filing Date Aug. 11, 2011, claiming priority of IL Patent Applications No. 240545, filed Aug. 12, 2015, which are hereby incorporated by reference.

FIELD OF THE INVENTION

The present invention is generally in the field astronomical imagining and in particular to the field of processing and comparing images.

BACKGROUND OF THE INVENTION

Transient detection and flux measurement stand at the base of time domain astronomy. Due to changing seeing conditions, the detection of new sources on complex constant background is a highly non-trivial problem. Existing solutions for these problems experience large and significant problems, as hordes of image subtraction artifacts swamp real transients in numbers. The existing remedy for this problem uses highly complex solutions using machine learning algorithms to narrow the sea of candidates. Last, human scanners sift through the remaining candidates to extract the real transient signals from the stack of candidates.

Detection of previously unknown transient sources is at the base of many fields of astronomy. Examples for such are the searches for Supernovae and microlensing events. The problem of image subtraction has proven to be hard to tackle, with many suggested solutions e.g., [Phillips & Davis 1995, *Astronomical Data Analysis Software and Systems IV*, 77, 297; Alard, & Lupton, 1998, *ApJ*, 503, 325; Bramich, 2008, *MNRAS*, 386, L77; Gal-Yam, Maoz, Guhathakurta, & Filippenko, 2008, *ApJ*, 680, 550]. The reason for the difficulty in subtracting images is that the point spread function (PSF) of images taken from the ground is varying. This change in the observations' PSF can generate many subtraction artifacts in the naive subtraction of the images.

The solution used by most surveys is based on the algorithm of Alard & Lupton for the image subtraction itself. After that, a detection process occurs, such as applying a matched filter and searching for new sources. This solution is far from being perfect and many so called "subtraction artifacts" remain after its operation.

These subtraction artifacts that are produced by popular image subtraction methods such as Alard & Lupton and Bramich 2008] are caused by the need to solve a complex inversion problem. This inversion problem can be regarded as a regularization effort on the partial deconvolution done by Phillips & Davis. Apart of being slow, this inversion problem is in itself an effective deconvolution, as the numerical instability of the deconvolution process cannot be swept under the rug. In cases where the PSF of the new image is substantially different from the reference PSF, the above algorithms can either cause ringing artifacts to appear in the subtraction image due to the effective division in Fourier plane, or can fail to shape the PSF of reference image to the form of the new image PSF, leaving many subtraction artifacts of a naive subtraction with non-matching PSF's appear.

These artifacts prevent the automatic detection of transients by causing many false positive signals. The current state of the art solution to this problem is to train a machine learning algorithm, e.g., [Bloom, Richards, Nugent, et al. 2012, *PASP*, 124, 1175; Goldstein, D'Andrea, Fischer et al. 2015, arXiv:1504.02936; Wright, Smartt, Smith, et al. 2015, MNRAS] to filter most of the artifacts and reduce the number of false positives to the minimum. Later, human scanners sift through all remaining candidate detections and decide which is real and which is not.

This elaborated process can undermine the successful operation of a transient detection survey in many ways. The first is that employing many human scanners can be very cumbersome and expensive. Many current surveys are spending lots of manpower on candidate sifting, examples for such surveys are PTF [Law, Kulkarni, Dekany, et al. 2009, *PASP*, 121, 1395] and PANSTARRS [Kaiser, Aussel, Burke, et al. 2002, *Proc. SPIE*, 4836, 154]. This use of human scanners is un-scalable, and is unfeasible for future surveys like LSST [Ivezic, Tyson, Abel, et al. 2008, arXiv: 0805.2366].

The second is that it incurs time delay on transient detection, as it is very hard for human scanners to detect transients in real time. This can damage greatly many science cases in which it is of utmost importance to make rapid follow-up observations of new transients. Moreover, at least some machine learning algorithms throw away real obvious transients. Finally, the human scanning step makes it very difficult to estimate the completeness transient surveys as human scanners cannot be persistent in their decision making process. An example for such a science case is the characterization of the circumstellar environments of supernovae progenitors, which is possible only with rapid follow-up in timescales of hours Gal-Yam et al.

Another problem is that even human scanners can be unsure if a transient is real or not, and many surveys adapt the methodology of accepting only candidates that are persistent in two or more consecutive observations. Needless to say, this methodology trades survey speed with the credibility of candidates.

Last, this scanning methodology prevents transient detection at the faintest limit, as it makes the statistics of detection hard to quantify, and relies on visual inspection of human scanners which from obvious reasons cannot detect transients at the statistical detection limit.

Brief Overview of Existing Methods for Image Subtraction

The solutions suggested to image subtraction divide naturally to two variants. The first, and more popular, variant could in general be referred to as regularized partial deconvolution. Solutions in this family are of Phillips & Davis; Alard & Lupton; and Bramich 2008. Gal-Yam et al. suggested a second variant, which is called herein "symmetric matched filtering".

Denoting the new image by N and its PSF by $P_N$, the reference image by R and its PSF by $P_R$, the first approach attempts to find a convolution kernel k such that:

$$N - k \otimes R \cong 0 \qquad (1)$$

The first solution suggested for finding such a kernel k was given by Phillips & Davis. They simply suggested to perform a deconvolution solution in Fourier space:

$$\hat{k} = \frac{\hat{P}_N}{\hat{P}_R} \approx \frac{\hat{N}}{\hat{R}} \quad (2)$$

where ˆ represents Fourier transform. However, this solution is numerically unstable as the deconvolution operation can (and many times does) involve division by small numbers.

Alard & Lupton suggested a practical way to solve the numerical instability problem. Representing k as a set of basis function, and noting that Eq. 1 is linear, they suggested solving for k using linear least squares. Alard & Lupton suggested using a set of basic functions, which are linear combinations of Gaussians multiplied with low degree polynomials. Later on, Bramich 2008 suggested solving for the values of a pixelized kernel. Both the Alard & Lupton method and the Bramich 2008 method can be viewed as regularization of the deconvolution method of Phillips & Davis, i.e. restricting the solutions for the kernel k to some set of "logical" solutions.

Even though the numerical stability of these algorithms is better than that of Eq. 2, they still have several problems: First, the division by zero problem is still there and it can become especially pronounced when the new image has a narrower PSF (actually, it suffices for it to be narrower in some axis) compared with the reference image (interestingly, these methods are a-symmetric to the new and reference image, while the problem is symmetric to the exchange of R and N). Second, there is no statistical justification for any of these methods, there is no rigorous proof they are not losing information, and it is unclear what further image processing should be applied. For example, does one need to apply another matched filter on the subtracted image? If so, which filter should one use? Third, there is no clear prescription on how to set a detection threshold for new source detection and how to decide if a detected source is real or an artifact, or to quantify the probability of it being a false positive.

The symmetric matched filtering solution suggested by Gal-Yam et al. is to match filter the new image with the PSF of the reference image, vice versa, and subtract. i.e.:

$$S_{Gal-Yam08} = P_r \otimes N - P_n \otimes R \quad (3)$$

This solution is always numerically stable, and leaves no subtraction artifacts. The problem with this solution is that again, there is no statistical justification apart from common sense. This solution was generally disregarded in the community mostly due to the concern that it loses sensitivity. This claim can also be derived using the common sense in which if you apply it to two images with equal PSF's, the subtraction image has an effective PSF which is twice as wide as the original, leading to a loss in sensitivity.

It should be mentioned that the problem of subtracting two images, and minimizing the resulting difference image in the least square sense has an infinite number of solutions (also in [Yuan & Akerlof 2008, 677, 808]). For example, the linear equation:

$$K_r \otimes R - K_n \otimes N \cong 0, \quad (4)$$

where $K_r$ and $K_n$ are arbitrary kernels, has an infinite number of solutions. This is because for any $K_r$, one can find $K_n$ that satisfies Eq. 4 in the least squares sense. This simple analysis shows that all the mentioned subtraction methods are focused on making the PSF of the two images identical, with very little attention to the maximization of the signal-to-noise ratio (S/N) of a transient source that appears in one of the images. In a sense, these methods do not solve the transient detection problem, but a different problem, which is how to make two images as similar as possible, using convolution.

Accordingly there is a long felt need for a method that can be numerically stable, maximally sensitive and fast to compute.

SUMMARY OF THE INVENTION

In the following new methods and systems are demonstrated for canceling the constant-in-time image and maximizing the S/N of a transient source, at the same time.

According to some embodiments, a closed method is provided for image subtraction in general, and transient detection in particular. This is achieved by analyzing together both the cancellation of the constant sky image and the further statistical analysis required for transient detection. The method provides the best linear solution in the context of background limited noise. The statistical behavior of the provided method near bright sources can be trivially characterized, leading to the prevention of subtraction artifacts in the vicinity of bright objects. Furthermore, the provided method is always numerically stable, trivial to implement, analyze and is significantly faster than popular methods or algorithms.

In the following, it is demonstrated that any statistical measurement or decision on the data can be performed optimally and intuitively on the same subtraction image, which is noted herein as the "proper image subtraction" statistic. This image has many good and intuitive qualities such as: In the case of no differences between the reference and the new image, it has expectancy zero everywhere, all pairs of pixels are uncorrelated and all pixels are of equal variance. Moreover, it has a closed formula effective PSF, that by match filtering it reproduces the optimal transient detection statistic. This image could be used to detect and filter out particle hits in both the reference and the new image, separating them from real sources.

The method is demonstrated on simulated images and real images, taken as part of the Palomar Transient Factory PTF; Law et al., data release 1.

According to some embodiments, a new method is provided for processing at least two M-dimensional data-measurements (DMs) of a physical-property for detecting one or more new-objects and/or a transition of one or more known-objects, in complex constant-background DMs, using at least one processor and at least one memory element, the method comprising:

generating a filtered-new-DM by match-filtering a new-DM, respective to impulse response of a reference-DM;

generating a filtered-reference-DM by match-filtering the reference-DM, respective to impulse response of the new-DM;

generating an M-dimensional object-indicator (OI) by subtracting the filtered-reference-DM from the filtered-new-DM, or vice versa; and generating an M-dimensional data score (DS) from the M-dimensional OI, where each of the scores is a probe for existence of an object at a specific M-dimensional location.

In some embodiments, the generating of the DS further comprising normalizing spatial or temporal frequencies of the physical property within the OI, wherein each of the frequencies is normalized by standard deviation (STD) of its own noise; thereby resolution components of the normalized-OI are having physical-property noise of equal variance and further wherein the physical-property noise is uncorrelated between the resolution components.

In some embodiments, the generating of the DS further comprising multiplying each frequency, of the OI or of the normalized-OI, by its conjugated frequency-response divided by the frequency's noise-variance; thereby each frequency of the DS has a frequency-response which is equal to its noise-variance.

In some embodiments, the method further comprises measuring physical-property at the normalized-OI and/or at the DS.

In some embodiments, the method further comprises detecting at least one new object and/or a transition for at least one known-object at the normalized-OI and/or at the DS.

In some embodiments, the detecting is responsive to positive and/or negative predetermined thresholds for the physical property.

In some embodiments, the method further comprises generating the reference-DM by accumulating plurality of match-filtered original-reference-DMs and/or generating the new-DM by accumulating plurality of match-filtered original-new-DMs, wherein the filtering is respective to each of their impulse responses.

In some embodiments, the accumulating further comprises at least one selected from the group consisting of: combining, coadding, and superpositioning.

In some embodiments, all of the DMs are of same field of measuring.

In some embodiments, each of the DMs is acquired at a single timestamp.

In some embodiments, M is a positive integer.

In some embodiments, the reference-DM and the new-DM, are each measured by a different measuring device.

In some embodiments, reference-DM and the new-DM are each measuring a different physical property.

In some embodiments, the reference-DM and the new-DM cover same field of measuring, measured simultaneously or at different time steps, wherein each is measured at different a wavelength.

In some embodiments, the reference-DM and the new-DM: cover same field of measuring, are measured by same measuring device, and are having different PSF—due to deformation of the object between their measurements; i.e. the object moves as often happens in medical/scientific images, or is viewed from a very different angle, as often happens in satellite images.

In some embodiments, the method further comprises convolving the normalized-OI with a movement detection kernel; the PSF convolved with (Sh(dx,dy)−\delta(0,0)) where Sh is the shift operator, shifting the image by (dx,dy), which are small fractions of a pixel, and where \delta(0,0) is an image with 1 at the origin and zeros everywhere else), thereby creating a movement indicator.

In some embodiments, the method further comprises normalizing the DS using any noise model.

In some embodiments, the method further comprises normalizing the DS using a registration noise correction.

In some embodiments, the method further comprises normalizing the DS using a source noise correction.

In some embodiments, the physical-property is flux, the DMs are images, and the resolution components are pixels.

In some embodiments, the physical-property is voltage and the DMs are radio signals.

In some embodiments, the physical-property is opacity and the DMs are tomographic measurements.

According to some embodiments, a new transient or non-transient new computer readable medium (CRM) is provided that, when loaded into a memory of a computing device and executed by at least one processor of the computing device, configured to execute the steps of a computer implemented method for processing at least two M-dimensional data-measurements (DMs) of a physical-property for detecting one or more new-objects and/or a transition of one or more known-objects, in complex constant-background DMs, the method comprising:

generating a filtered-new-DM by match-filtering a new-DM, respective to impulse response of a reference-DM;

generating a filtered-reference-DM by match-filtering the reference-DM, respective to impulse response of the new-DM;

generating an M-dimensional object-indicator (OI) by subtracting the filtered-reference-DM from the filtered-new-DM, or vice versa; and generating an M-dimensional data score (DS) from the M-dimensional OI, where each of the scores is a probe for existence of an object at a specific M-dimensional location.

According to some embodiments, a new computer system having at least one processor and at least one memory element is provided, the system configured to process at least two M-dimensional data-measurements (DMs) of a physical-property for detecting one or more new-objects and/or a transition of one or more known-objects, in complex constant-background DMs, the system comprising:

a filtering-module, stored in the memory, configured
to generate a filtered-new-DM by match-filtering a new-DM, respective to impulse response of a reference-DM; and
to generate a filtered-reference-DM by match-filtering the reference-DM, respective to impulse response of the new-DM;

a processing-module, stored in the memory, configured
to generate an M-dimensional object-indicator (OI) by subtracting the filtered-reference-DM from the filtered-new-DM, or vice versa; and
to generate an M-dimensional data score (DS) from the M-dimensional OI, where each of the scores is a probe for existence of an object at a specific M-dimensional location.

In some embodiments, the processing-module further configured to generate an M-dimensional normalized-OI, by normalizing spatial or temporal frequencies of the physical property within the OI, wherein each of the frequencies is normalized by standard deviation (STD) of its own noise; thereby resolution components of the normalized-OI are having physical-property noise of equal variance and further wherein the physical-property noise is uncorrelated between the resolution components.

In some embodiments, the processing-module further configured to multiply each frequency, of the OI or of the normalized-OI, by its conjugated frequency-response divided by the frequency's noise-variance; thereby each frequency of the DS has a frequency-response which is equal to its noise-variance.

In some embodiments, the system further comprises a measuring-module, stored in the memory, configured to measure the physical-property at the normalized-OI and/or at the DS.

In some embodiments, the system further comprises a detecting-module, stored in the memory, configured to detect at least one new object and/or a transition for at least one known-object at the normalized-OI and/or at the DS.

In some embodiments, the detecting is responsive to positive and/or negative predetermined thresholds for the physical property.

In some embodiments, the system further comprises an accumulating-module, stored in the memory, configured to generate the reference-DM by accumulating plurality of match-filtered original-reference-DMs and/or to generate the new-DM by accumulating plurality of match-filtered original-new-DMs, wherein the match-filtering is respective to each of their impulse responses.

In some embodiments, the accumulating further comprises at least one selected from the group consisting of: combining, coadding, and superpositioning.

According to some embodiments, a new method is provided for processing at least two M-dimensional data-measurements (DMs), using at least one processor and at least one memory element, the method comprising:

generating a filtered-first-DM by match-filtering a first-DM, respective to impulse response of a second-DM;

generating a filtered-second-DM by match-filtering the second-DM, respective to impulse response of the first-DM;

generating an M-dimensional third-DM by subtracting the filtered-second-DM from the filtered-first-DM, or vice versa; and generating an M-dimensional normalized-DM by normalizing spatial or temporal frequencies of the physical property within the third-DM, wherein each of the frequencies is normalized by standard deviation (STD) of its own noise;

thereby resolution components of the normalized-DM are having physical-property noise of equal variance and further wherein the physical-property noise is uncorrelated between the resolution components.

In some embodiments, the system further comprises generating an M-dimensional data score (DS), where each of the scores is a probe for existence of an object at a specific M-dimensional location; the DS generated by multiplying each frequency, of the normalized-DM, by its conjugated frequency-response divided by the frequency's noise-variance; thereby each frequency of the DS has a frequency-response which is equal to its noise-variance.

BRIEF DESCRIPTION OF THE DRAWINGS

The subject matter disclosed may best be understood by reference to the following detailed description when read with the accompanying drawings in which:

FIGS. 4A, 4B, 4C, 4D, 4E and 4F conceptually demonstrate subtraction of simulated images with symmetric Gaussian PSF with sigma-width of 2 and 3 pixels, for the reference and new images, respectively;

FIGS. 5A, 5B, 5C, 5D, 5E and 5F conceptually demonstrate similar features as in FIGS. 4A-4F, for the subtraction of simulated images with a-symmetric Gaussian PSF with sigma-width of 2 by 4 pix in the new image and 4 by 2 pix in the reference image;

FIGS. 6A, 6B, 6C, 6D, 6E and 6F conceptually demonstrate subtraction of simulated images with 0.3 pix (RMS) astrometric noise and symmetric Gaussian PSF with sigma-width of 2 and 3 pixels, for the reference and new images, respectively;

FIGS. 7A, 7B, 7C, 7D, 7E and 7F conceptually demonstrate image subtraction results, for test 1 images (Table 2);

Figure 1:
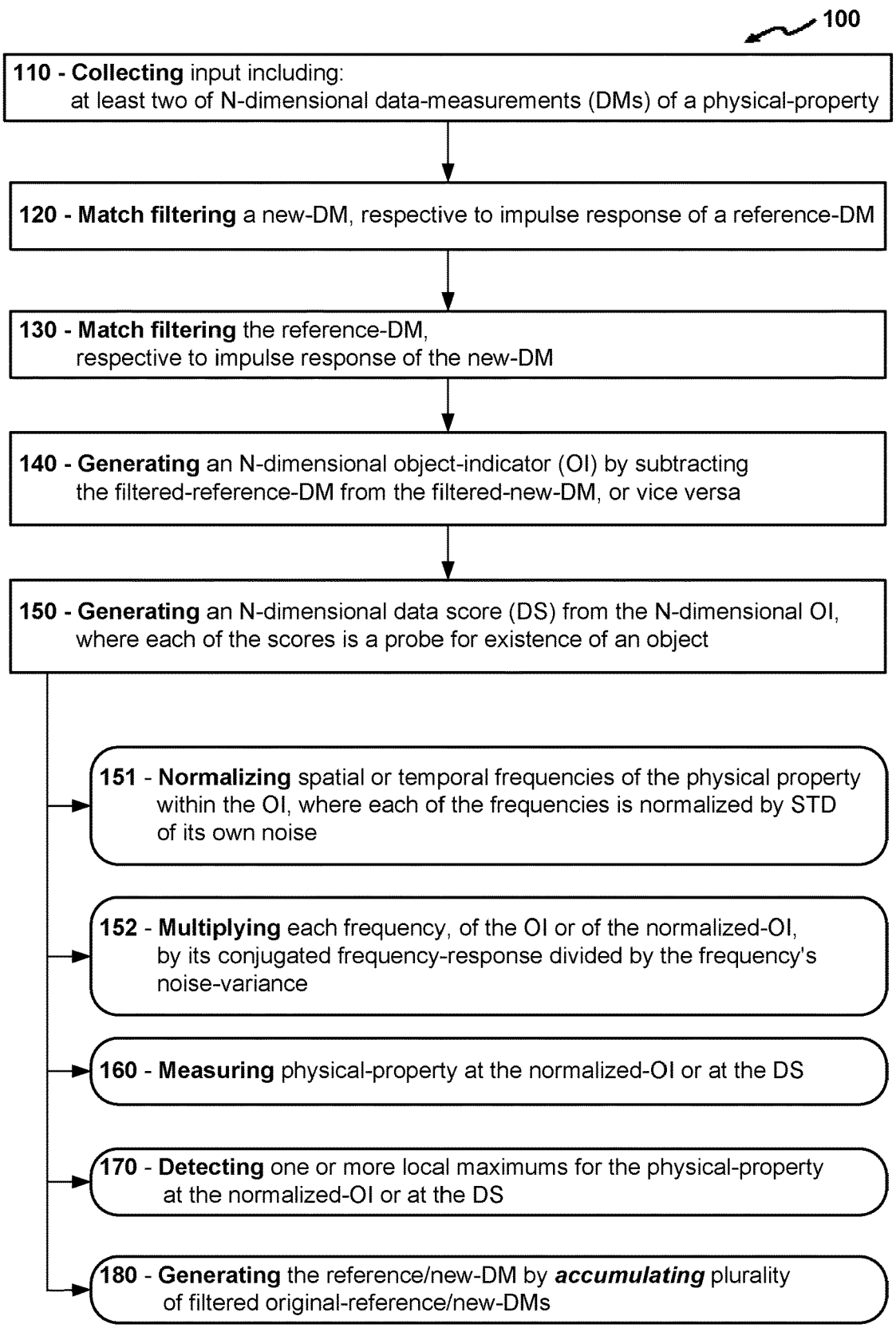
FIG. 1 conceptually illustrates the method according to embodiments of the invention.

For simplicity and clarity of illustration, elements shown are not necessarily drawn to scale, and the dimensions of some elements may be exaggerated relative to other elements. In addition, reference numerals may be repeated to indicate corresponding or analogous elements.

DETAILED DESCRIPTION OF THE INVENTION

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a computer implemented method and system for processing complex M-dimensional data-measurements and particularly astronomical images.

1. Introduction to Terms

The terms "coaddition", "coadding" or similarities thereof, used herein, refer to a process of where images, or M-dimensional measurements, from an input grid are sampled and added to a common output grid.

The terms "match filter" or "match filtering", used herein, refer to correlating a known signal, or template, with an unknown signal to detect the presence of the template in the unknown signal. This is equivalent to convolving/convoluting (convolution) the unknown signal with a conjugated reversed version of the template.

The terms "convolution", "convolving", "convoluting", or similarities thereof, used herein, refer to a mathematical operation on two functions $f$ and g, producing a third function that is typically viewed as a modified version of one of the original functions, giving the area overlap between the two functions as a function of the amount that one of the original functions is translated.

The term "source", used herein, refers to any object being observed, and in the application of astronomical imaging to an object emitting or reflecting light.

The term "flux", used herein, refers to any physical property being measured, and in the application of astronomical imaging to the flow of a physical property in space, for example light.

The term "point spread function (PSF)", used herein, refers to a response of an imaging system to a point source or point object. A more general term for the PSF is a system's impulse response, the PSF being the impulse response of a focused optical system.

The term "impulse response", used herein, refers to an output of a dynamic system, when presented with a brief input signal. More generally, an impulse response refers to the reaction of any dynamic system in response to some external change.

The term "frequency response", used herein, refers to a quantitative measure of the output spectrum of a system or device, in response to a stimulus, and is used to characterize the dynamics of the system. It is a measure of magnitude and phase of the output as a function of frequency, in comparison to the input.

The term "bad pixel/s", refers to pixels that their value is of little- or no-indication to the true light impinging on them. Bad pixels may be caused either by permanent manufacturing defects or by sudden/erratic electric phenomena in the detector.

The term "reflection ghost", used herein, refers to a feature or shape at the focal plane of a camera or other optical instrument that is not present in an actual scene, or an unfocused duplicate image that is overlaid upon a desired image. Ghost images, or ghost reflection, are caused by reflections from the surfaces of lenses or windows. Each glass surface divides incoming light into two parts: a transmitted part that passes through the surface, and a reflected part that is turned back. If the reflected light is turned back again by reflection from another glass surface or a mirror, it may travel to the focal plane to form a ghost image. Ghost images may appear as an out-of-focus blur or smudge, a sharp circle or polygon with the shape of the camera iris or other aperture, or a false image of an object within a scene.

2. Preferred Embodiments

According to some embodiments, the present invention provides a new method and system for processing at least two M-dimensional data-measurements (DMs) of a physical-property for detecting one or more new-objects and/or a transition of one or more known-objects, in complex constant-background DMs.

FIG. 1 conceptually illustrates embodiments of the present invention for a method (100) for processing at least two M-dimensional data-measurements (DMs) of a physical-property for detecting one or more new-objects and/or a transition of one or more known-objects, in complex constant-background DMs, the method comprising:
  collecting (110) the at least two M-dimensional data-measurements (DMs) of a physical-property;
  generating (120) a convoluted-new-DM by convoluting a new-DM by reversed impulse response of a reference-DM;
  generating (130) a convoluted-reference-DM by convoluting the reference-DM by reversed impulse response of the new-DM;
  generating (140) an M-dimensional object-indicator (OI) by subtracting the convoluted-reference-DM from the convoluted-new-DM, or vice versa; and
  generating (150) an M-dimensional data score (DS) from the M-dimensional OI, where each of the scores is a probe for existence of an object at a specific M-dimensional location.

In some embodiments, the method (100) the generating of the DS further comprising normalizing (151) spatial or temporal frequencies of the physical property within the OI, wherein each of the frequencies is normalized by standard deviation (STD) of its own noise; thereby resolution components of the normalized-OI are having physical-property noise of equal variance and further wherein the physical-property noise is uncorrelated between the resolution components.

In some embodiments, the method (100) the generating of the DS further comprising multiplying (152) each frequency, of the OI or of the normalized-OI, by its conjugated frequency-response divided by the frequency's noise-variance; thereby each frequency of the DS has a frequency-response which is equal to its noise-variance.

In some embodiments, the method (100) further comprising measuring (160) physical-property at the normalized-OI and/or at the DS.

In some embodiments, the method (100) further comprising detecting (170) at least one new object and/or a transition for at least one known-object at the normalized-OI and/or at the DS. According to some embodiments, the detecting is responsive to positive and/or negative predetermined thresholds for the physical property.

In some embodiments, the method (100) further comprising generating (180) the reference-DM by accumulating plurality of match-filtered original-reference-DMs and/or generating the new-DM by accumulating plurality of match-filtered original-new-DMs, wherein the match-filtering is respective to each of their impulse responses. According to some embodiments, the accumulating further comprises at least one selected from the group consisting of: combining, coadding, and superpositioning.

Figure 2:
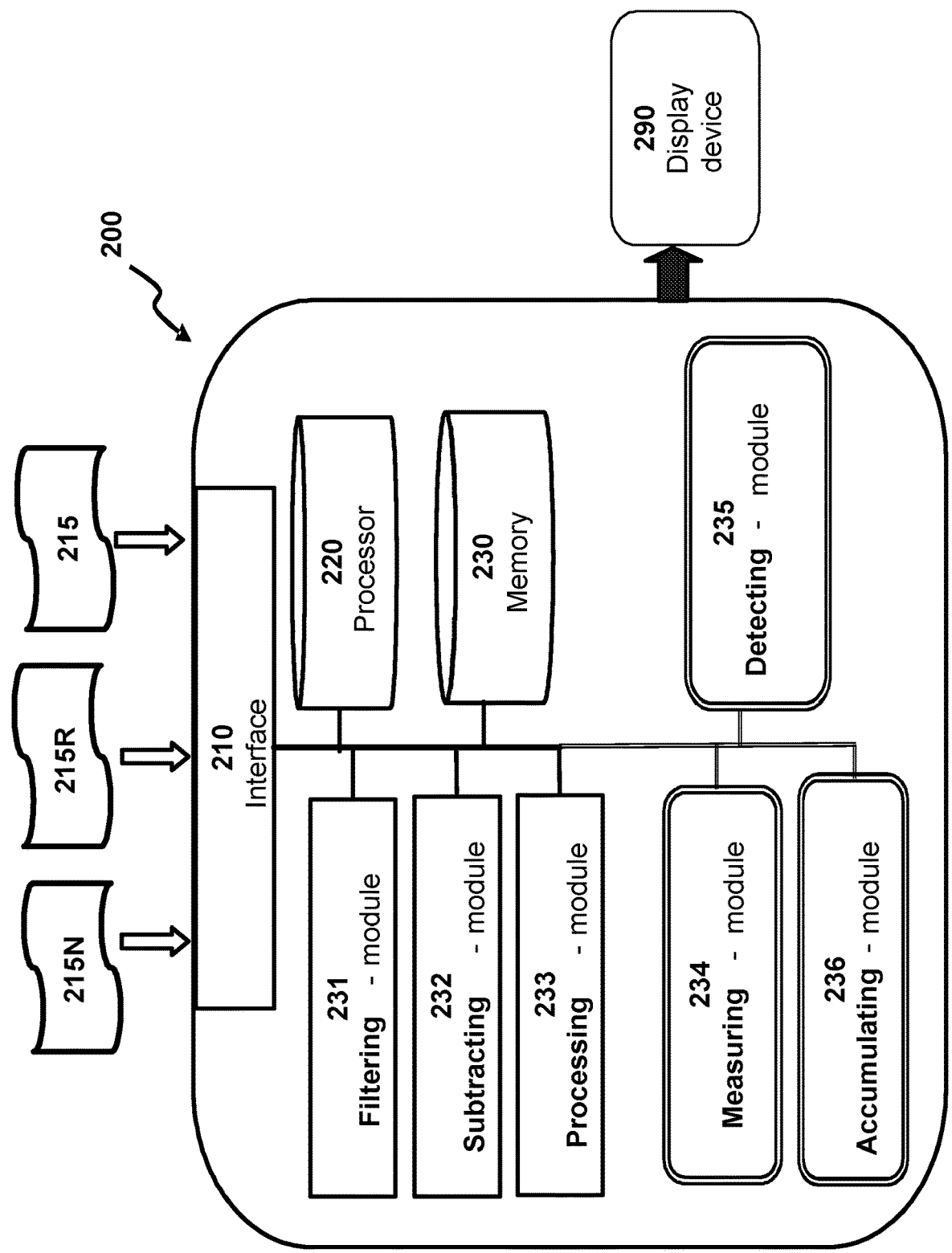
FIG. 2 conceptually illustrates the system according to embodiments of the invention.
Figure 3C:
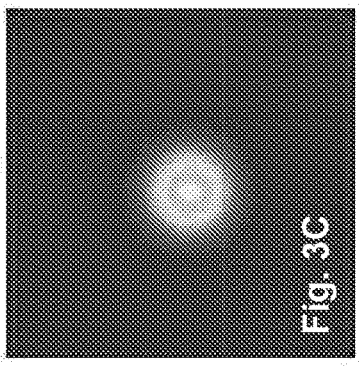
FIGS. 3A, 3B, 3C, 3D, 3E, 3F, 3G, 3H and 3I conceptually demonstrate the point spread functions (PSFs) of the new image $P_n$ and the reference image $P_r$, and the PSF $P_D$ of the corresponding difference image D for three cases of: symmetric Gaussians (FIGS. 3A-3C), a-symmetric Gaussians (FIGS. 3D-3F), and speckle (FIGS. 3G-3I) images.
Figure 3F:
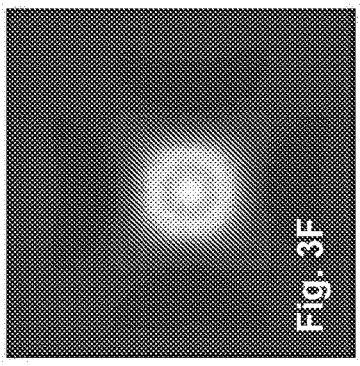
Figure 3I:
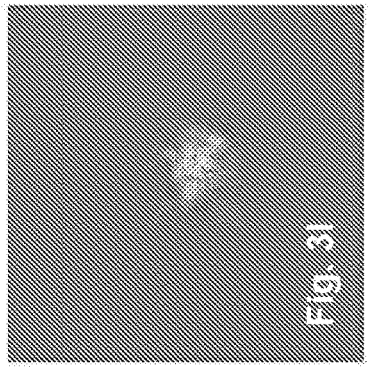
Figure 3B:
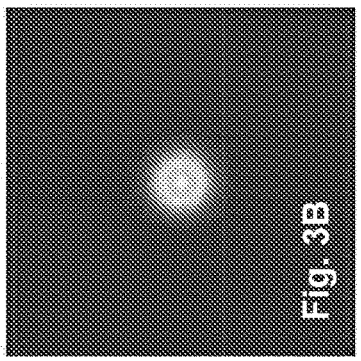
Figure 3E:
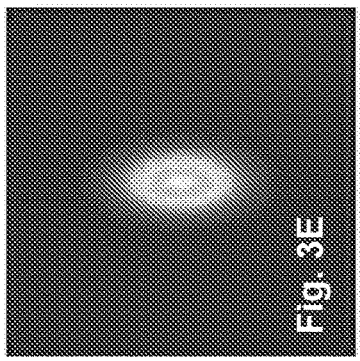
Figure 3H:
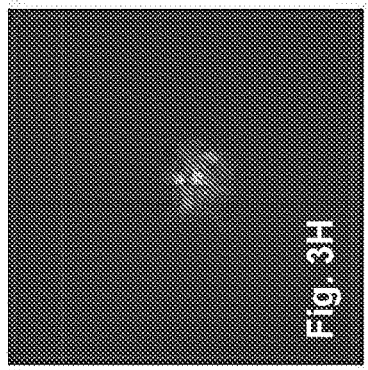
Figure 3A:
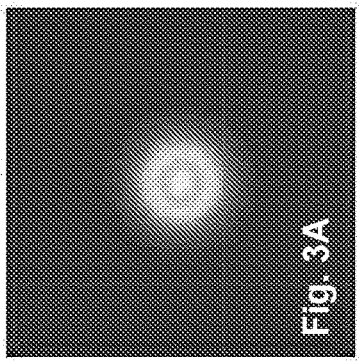
Figure 3D:
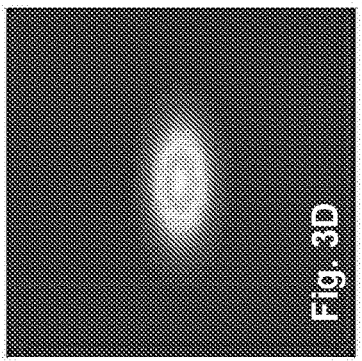
Figure 3G:
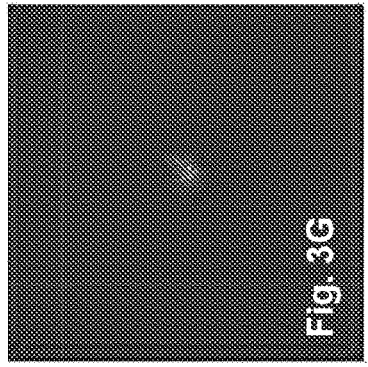

FIG. 2 conceptually illustrates embodiments of the present invention for a system (200), having at least one processor (230) and at least one memory element (240), for processing at least two M-dimensional data-measurements (DMs) of a physical-property for detecting one or more new-objects and/or a transition of one or more known-objects, in complex constant-background DMs, the system comprising:
  an input interface (210) configured to collect the at least two M-dimensional DMs (215);
  a filtering-module (231), stored in the memory, configured to:
    generate a convoluted-new-DM by convoluting a new-DM (215N) by reversed impulse response of a reference-DM (215R);
    generate a convoluted-reference-DM by convoluting the reference-DM (215R) by reversed impulse response of the new-DM (215N);
  a subtracting-module (232), stored in the memory, configured to generate an M-dimensional object-indicator (OI) by subtracting the convoluted-reference-DM from the convoluted-new-DM, or vice versa; and
  a processing-module (233), stored in the memory, configured to generate an M-dimensional normalized-OI by normalizing spatial or temporal frequencies of the physical property within the OI, wherein each of the frequencies is normalized by standard deviation (STD) of its own noise;
  thereby resolution components of the normalized-OI are having physical-property noise of equal variance and further wherein the physical-property noise is uncorrelated between the resolution components.

In some embodiments, the processing-module (233) further configured to generate an M-dimensional normalized-OI, by normalizing spatial or temporal frequencies of the physical property within the OI, wherein each of the frequencies is normalized by standard deviation (STD) of its own noise; thereby resolution components of the normalized-OI are having physical-property noise of equal variance and further wherein the physical-property noise is uncorrelated between the resolution components.

In some embodiments, the processing-module (233) further configured to multiply each frequency, of the OI or of the normalized-OI, by its conjugated frequency-response divided by the frequency's noise-variance; thereby each frequency of the DS has a frequency-response which is equal to its noise-variance.

In some embodiments, the system (200) further comprises a measuring-module (234), stored in the memory, configured to measure the physical-property at the normalized-OI or at the DS.

In some embodiments, the system (200) further comprises a detecting-module (235), stored in the memory, and configured to detect at least one new object and/or a transition for at least one known-object at the normalized-OI or at the DS. According to some embodiments the detecting is responsive to positive and/or negative predetermined thresholds for the physical property.

In some embodiments, the system (200) further comprises an accumulating-module (236), stored in the memory, configured to generate the reference-DM by accumulating plurality of match-filtered original-reference-DMs and/or to generate the new-DM by accumulating plurality of match-filtered original-new-DMs, wherein the match-filtering is respective to each of their impulse responses. According to some embodiments the accumulating further comprises at least one selected from the group consisting of: combining, coadding, and superpositioning.

In some embodiments the system (200) further comprises a display device (290), configured for displaying at least any of: the DMs (215,215R,215N), their OI, their normalized-OI and/or their DS.

According to some embodiments, the present invention further provides a new processing-method for processing at least two M-dimensional data-measurements (DMs), using at least one processor and at least one memory element, the method comprising:
- generating a filtered-first-DM by match-filtering a first-DM, respective to impulse response of a second-DM;
- generating a filtered-second-DM by match-filtering the second-DM, respective to impulse response of the first-DM;
- generating an M-dimensional third-DM by subtracting the filtered-second-DM from the filtered-first-DM, or vice versa; and
- generating an M-dimensional normalized-DM by normalizing spatial or temporal frequencies of the physical property within the third-DM, wherein each of the frequencies is normalized by standard deviation (STD) of its own noise;
- thereby resolution components of the normalized-DM are having physical-property noise of equal variance and further wherein the physical-property noise is uncorrelated between the resolution components.

In some embodiments, the processing-method further comprising generating an M-dimensional data score (DS), where each of the scores is a probe for existence of an object at a specific M-dimensional location; the DS generated by multiplying each frequency, of the normalized-DM, by the frequency's conjugated frequency-response divided by the frequency's noise-variance; thereby each frequency of the DS has a frequency-response which is equal to its noise-variance.

In some embodiments, all of the DMs are of same field of measuring. According to some embodiments, each of the DMs is acquired at a single timestamp.

In some embodiments, M is a positive integer.

In some embodiments, the physical-property is flux, the DMs are images, and the resolution components are pixels.

In some embodiments, the physical-property is voltage and the DMs are radio signals.

In some embodiments, the physical-property is opacity and the DMs are tomographic measurements.

In the following sections § 3-§ 13, detailed embodiments and examples of the current invention are disclosed, which are mostly related to image processing and in particular to the processing of astronomical images, for a non-limiting example, astronomical detection and/or tracking of space junk or near-earth asteroids. However, the present invention may be applied to a variety of data processing applications, including but is not limited to:

Tomography imaging, which refers to imaging by sections or sectioning, through the use of any kind of penetrating wave. Therefore applications of the provided method may be used in radiology, archaeology, biology, atmospheric science, geophysics, oceanography, plasma physics, materials science, astrophysics, quantum information, and other sciences. In most cases, it is based on the mathematical procedure called tomographic reconstruction.

The medical applications may include, for a non-limiting example, a search for medical findings and follow up in changes of these medical findings, like the finding new tumors, and/or following their progress.

Other applications for the newly provided method also include Geo-Imaging, Earth imaging, and remote sensing, including but not limited to: Earth surface imaging either from airplanes or satellites; weather, ocean or ground measurements using various sensing devices; or measuring from space characteristics that distinguish the ocean from other bodies of water—its salt concentration or salinity.

Other applications may include analysis of time series, subject to non-white noise, where the data can be received from: microphones, geophones, hydrophones, and more.

3. Statistical Derivation

Given the numerous problems with previous image subtraction methods, the transient detection problem is now placed on firm statistical grounds. In section § 3.1 the derivation is outlined and formulated of the image subtraction statistics. Given that the full derivation is tedious it is differed and elaborated in section § 9 (Full derivation of the image subtraction statistics). In section § 3.2 It is demonstrated that the best way to build a reference image, for the purpose of image subtraction, is to use the image coaddition algorithm of [Zackay & Ofek, 2015a, arXiv:1512.06872 and Zackay & Ofek, 2015b, arXiv:1512.06879]. The derivation in section § 3.1 assumes that the images are background-noise dominated (i.e., the objects can have source noise, which is lower than the background noise). This causes an underestimation of the noise near bright sources. In section § 3.3 a simple correction to the image subtraction formulae is presented that deals with the source noise and other errors, like registration noise. In section § 3.4 an accurate treatment of astrometric shifts, noise and color-refraction errors are presented. In section § 3.5 a suggested method is outlined to equalize the flux zero points of the new and reference images. In section § 3.6 an algorithm for optimal PSF photometry in the subtraction image is provided, while in section § 3.7 it is described how this method can be used for cosmic-ray, "bad" pixels and reflection-ghost identification.

3.1. Transient Source Detection Using Image Subtraction

From first principles, an optimal method is derived for transient source detection, under the assumptions that the images are background-noise dominated, and the noise is Gaussian and independent (In practice the pixels maybe slightly correlated due to charge repulsion and charge diffusion in a CCD).

Let R and N be the background-subtracted reference image and the background-subtracted new image, respectively. Denoted by T is the background-subtracted true constant sky image. Denoted by $P_r$ and $P_n$ are the point spread functions (PSFs) of the reference image and the new image, respectively. $P_r$ and $P_n$ are normalized to have unit sum. It is assumed that $P_n$, $P_r$, and the flux-based zero points of the new image ($F_n$) and reference image (F) are known; following Zackay & Ofek (2015a, 2015b) this factor represents the product of atmospheric transparency, telescope and detector transmission and integration time. A method for finding $F_n$ and $F_r$ is presented in section § 3.5, and the PSF measurements are disclosed in section § 7.2.

The expression for the reference image is:

$$R = F_r T \otimes P_r + \varepsilon_r, \quad (5)$$

where $\varepsilon_r$ is the additive noise component of the image R.

Given the null hypothesis, $H_0$, that states there are no new sources in the new image it can be written that:

$$N_{|H_0} = F_n T \otimes P_n + \varepsilon_n. \quad (6)$$

Given the alternative hypothesis, $H_1(q,\alpha)$, that states there is a new point source at position q with flux $\alpha$ in the new image, it can be written that:

$$N_{|H_1(q,\alpha)} = F_n T \otimes P_n + \alpha F_n \delta(q) \otimes P_n + \varepsilon_n, \quad (7)$$

where $\delta(q)$ denotes a two dimensional image with one at position q, and zero otherwise. It is assumed that the dominant source of noise is the background noise, $\varepsilon_r$ and $\varepsilon_n$ both satisfy that all pairs of pixels are uncorrelated—i.e., that for all pairs of pixels $x_1, x_2$ for which $x_1 \neq x_2$:

$$\text{Cov}(\varepsilon_r[x_1], \varepsilon_r[x_2]) = 0, \text{Cov}(\varepsilon_n[x_1], \varepsilon_n[x_2]) = 0, \quad (8)$$

and that all pixels have spatially uniform variance; as the convolution is a local operation, this assumption can be relaxed (Zackay & Ofek 2015a):

$$V(\varepsilon_r[x]) = \sigma_r^2, V(\varepsilon_n[x]) = \sigma_n^2. \quad (9)$$

Because both hypotheses are simple (where a simple hypothesis has no unknown parameters; by applying the hypothesis testing to each value of $\alpha$ and q separately; additional discussion in section § 9), the Neyman-Pearson lemma [Neyman & Pearson 1933 *Philosophical Transactions of the Royal Society of London A: Mathematical, Physical and Engineering Sciences*] can be used, that states that the most powerful statistic for deciding between two simple hypotheses is the likelihood ratio test (the power of a binary hypothesis test is the probability that the test correctly rejects the null hypothesis, when the alternative hypothesis is true):

$$L(q,\alpha) = \frac{P(N, R | H_0)}{P(N, R | H_1(q,\alpha))}, \quad (10)$$

where P denotes probability.

A critical point is, there is no prior information or assumptions on T. Therefore, the probabilities $P(N,R|H_0)$ and $P(N,$ $R|H_1(q,\alpha))$ cannot be directly calculated. However, their ratio can be calculated by developing the expression, using the law of conditional probabilities:

$$L(q,\alpha) = \frac{P(N | R, H_0) P(R | H_0)}{P(N | R, H_1(q,\alpha)) P(R | H_1(q,\alpha))}. \quad (11)$$

Next the fact that $H_0$ and $H_1$ predict the same likelihood to the reference can be used and cancel out the last multiplicative terms in the numerator and denominator. After some algebra, which is detailed in section § 9, the optimal statistic for source detection can be found:

$$\hat{S} \equiv \frac{1}{\alpha}\hat{\log}L = \frac{F_n F_r^2 \overline{\hat{P}_n} |\hat{P}_r|^2 \hat{N} - F_r F_n^2 \overline{\hat{P}_r} |\hat{P}_n|^2 \hat{R}}{\sigma_r^2 F_n^2 |\hat{P}_n|^2 + \sigma_n^2 F_r^2 |\hat{P}_r|^2}, \quad (12)$$

where the "over-line" symbol denotes the complex conjugate operation. By putting the "over-line" symbol above the "hat" symbol, refers to the complex conjugate operation following a Fourier transform operation. This statistic (or score image) is simply the log-likelihood ratio test between the two hypotheses. This score is calculated simultaneously for all values of $\alpha$, while each pixel in the score image refers to a different q position. It is important to note that Eq. 12 is a matched filter image and no further filtering is required. In order to find transients all that should be done is to identify local maxima (or minima) in S. The significance of a local maximum, in units of sigmas, is given by its value divided by the standard deviation of the image S.

Since Eq. 12 is a matched filter image, its pixels are correlated, and any hypothesis testing or measurement, other than transient detection and photometry (section § 3.6), requires a knowledge of the covariance between the pixels. An example for such hypothesis testing is cosmic-ray identification via image subtraction, or searching for variable nebulosity (e.g., light echoes). In order to have an image-subtraction method that is optimal for all purposes and easy to use, an image whose pixel noise is uncorrelated should be identified, and that cross-correlating this image with its own PSF returns Eq. 12. In section § 9 such an image is identified as:

$$\hat{D} = \frac{F_r \hat{P}_r \hat{N} - F_n \hat{P}_n \hat{R}}{\sqrt{\sigma_n^2 F_r^2 |\hat{P}_r|^2 + \sigma_r^2 F_n^2 |\hat{P}_n|^2}}, \quad (13)$$

The PSF of this image, normalized to have unit sum, is given by:

$$\hat{P}_D = \frac{F_r F_n \hat{P}_r \hat{P}_n}{F_D \sqrt{\sigma_n^2 F_r^2 |\hat{P}_r|^2 + \sigma_r^2 F_n^2 |\hat{P}_n|^2}}, \quad (14)$$

where $F_D$ is the flux-based zero point of the subtraction image, which is given by:

$$F_D = \frac{F_r F_n}{\sqrt{\sigma_n^2 F_r^2 + \sigma_r^2 F_n^2}} \quad (15)$$

By using this difference image D and its PSF it can be verified that the cross-correlation of D with $P_D$ returns:

$$S = F_D D \otimes \overleftarrow{P}_D, \quad (16)$$

where the backward arrow sign denotes coordinate reversal (i.e., $\overleftarrow{P}(x,y) = P(-x,-y)$). Alternatively in Fourier space:

$$\hat{S} = F_D \hat{D} \overline{\hat{P}_D}. \quad (17)$$

It is important to note that, in the background-dominated noise limit, D is a proper image, and hence referred herein as "the proper subtraction image". As in Zackay & Ofek (2015b) a proper image is defined to be an image whose noise is independent and identically distributed (i.i.d) (in practice the noise levels need to be identical only locally, on scales which are twice the PSF size, as the convolution is a local operation; in the vicinity of bright stars D is not proper). This means that D can be used for any hypothesis testing or measurement, without the need for the covariance between the pixels. Furthermore, in section § 13 a proof is presented that D and $P_D$ are in fact sufficient statistics for any hypothesis testing or measurement (in statistics, a statistic is sufficient with respect to a statistical model and its associated unknown parameter if no other statistic that can be calculated from the same sample provides any additional information as to the value of the parameter).

Eq. 13 and its PSF (Eq. 14) are adequate for detection of objects whose original shape was convolved with the telescope and atmosphere PSF. However, particle hit events do not share this PSF. In section § 13 the PSF is derived in the difference image D, of a δ-function in N or R. The PSF in the difference image D of a δ-function in N is:

$$\hat{P_{D_N}} = \frac{F_r \hat{P}_r}{F_{D_N} \sqrt{\sigma_n^2 F_r^2 |\hat{P}_r|^2 + \sigma_r^2 F_n^2 |\hat{P}_n|^2}}, \quad (18)$$

while the PSF in the difference image D of a δ-function in R is:

$$\hat{P_{D_R}} = \frac{F_n \hat{P}_n}{F_{D_R} \sqrt{\sigma_n^2 F_r^2 |\hat{P}_r|^2 + \sigma_r^2 F_n^2 |\hat{P}_n|^2}}. \quad (19)$$

These PSFs are also accompanied by the corresponding zero-points, $F_{D_N}$, $F_{D_R}$ that can be found in section § 13. These equations are useful if one would like to search for events which are similar to a delta function (e.g., "bad" pixels). It should be noted, that $\hat{P}_{D_N}$ and $\hat{P}_{D_R}$ in many cases can be approximated by a delta function. To summarize, in order to find a transient source in either the reference or the new image, D (Eq. 13) can be calculated and cross-correlated with its PSF (Eq. 14). Alternatively, one can calculate directly the statistic S (Eq. 12).

3.2. Construction of the Reference Image

Typically, the reference image is built by coadding multiple images. It is shown in the following that the best way to produce a reference image for subtraction is using the method described in Zackay & Ofek (2015b).

In the case of multiple reference images Eq. 5 should be replaced with the model for the j-th reference image:

$$R_j = F_j P_j \otimes T + \varepsilon_j. \quad (20)$$

Here $F_j$ is the flux-based zero point of the j-th reference image, $P_j$ is the PSF of the j-th reference image, and $\varepsilon_j$ is the noise of the j-th reference image. As before, the model for N assuming the null hypothesis, $H_0$, is given by Eq. 6, while if the first hypothesis, $H_1$, is true then N is given by Eq. 7.

As in the previous section, two simple hypotheses are tested. Therefore, the optimal test statistic is the likelihood ratio test [Neyman & Pearson]

$$L(q, \alpha) = \frac{P(N, R_1, ..., R_J | H_0)}{P(N, R_1, ..., R_J | H_1(q, \alpha))}. \quad (21)$$

As before, one can use the law of conditional probabilities, and the fact that $H_0$ and $H_1$ predict the same likelihood for all references. The full derivation is presented in section § 10, and after some algebra, the optimal reference image is given by:

$$\hat{R} = \frac{\sum_j \frac{F_j}{\sigma_j^2} \overline{\hat{P}_j} \hat{R}_j}{\sqrt{\sum_j \frac{F_j^2}{\sigma_j^2} |\hat{P}_j|^2}}. \quad (22)$$

The PSF (normalized to have unit sum) of the reference image is given by:

$$\hat{P}_R = \frac{\sqrt{\sum_j \frac{F_j^2}{\sigma_j^2} |\hat{P}_j|^2}}{F_r}, \quad (23)$$

where $F_r$ is the flux-based zero point of the reference:

$$F_r = \sqrt{\sum_j \frac{F_j^2}{\sigma_j^2}}. \quad (24)$$

This is similar to the optimal coaddition method, derived in Zackay & Ofek (2015b).

The reason R preserves all the information from the individual references is because in the computation of each frequency in R, random variables are added, scaled by their (conjugate) expectation, divided by the variance. This operation can be identified as the maximal S/N addition of random variables (as in Appendix A of Zackay & Ofek, 2015a; and where Zackay & Ofek 2015b demonstrate analysis and proof of sufficiency of this so called "proper coaddition" method).

3.3. Simple, Suboptimal Correction for Source Noise, Astrometric Noise and Color-Refraction Noise Eq. 12 ignores the source noise, and hence the noise level is underestimated in the vicinity of bright stars. The outcome of this can be that bright sources may be flagged as possible transients or variables. Furthermore, this equation ignores any additional important sources of noise like astrometric noise, astrometric scintillation noise, color-refraction noise, flux scintillation noise, and position-dependent flat-fielding errors.

A simple correction to this problem, albeit suboptimal, is to divide S by a correction factor that takes into account the local estimated variance of the extra noise. Derivation of this correction factor is demonstrated in section § 11. In the image space, the expression for the corrected S is $$S_{corr} = \frac{S}{\sqrt{V(S_N) + V(S_R) + V_{ast}(S_N) + V_{ast}(S_R) + \ldots}}. \quad (25)$$

Here the terms in the denominator may include any position-dependent contribution to the variance, that is not included in the $\sigma_n^2$ and $\sigma_r^2$ factors.

In this example two specific contributions are listed from the source noise and from astrometric noise. The first two terms in the denominator are the variance from the source noise in the new and reference images, respectively, while the next two terms are the variance due to astrometric noise. Other sources of noise like color-refraction can be added in a similar manner.

Here $V(S_N)$ is the variance of the part of S containing N given by:

$$V(S_N) = V(\varepsilon_n) \otimes (k_n^2), \quad (26)$$

and $V(S_R)$ is the variance of the part of S containing R given by:

$$V(S_R) = V(\varepsilon_r) \otimes (k_r^2), \quad (27)$$

and the Fourier transform of $k_r$ is given by:

$$\hat{k}_r = \frac{F_r F_n^2 \bar{\hat{P}}_r |\hat{P}_n|^2}{\sigma_r^2 F_n^2 |\hat{P}_n|^2 + \sigma_n^2 F_r^2 |\hat{P}_r|^2}, \quad (28)$$

while the Fourier transform of $k_n$ is:

$$\hat{k}_n = \frac{F_n F_r^2 \bar{\hat{P}}_n |\hat{P}_r|^2}{\sigma_r^2 F_n^2 |\hat{P}_n|^2 + \sigma_n^2 F_r^2 |\hat{P}_r|^2}. \quad (29)$$

The variance of $\varepsilon_n$ and $\varepsilon_r$ are simply the variance images. For a single image the variance map, $V(\varepsilon_n)$, is simply the number of electrons in each pixel (including the background), added with the readout noise squared. However, in the case of multiple images, the correct way to construct $V(S_R)$ is to calculate $k_r$, $V(\varepsilon_r)$, and $V(S)$ for each reference image and to sum all the individual $V(S_R)$ values up (as in section § 10). However, in many cases a reasonable approximation is to calculate $k_r$ from the properly coadded image, and calculate $V(\varepsilon_r)$ using a simple addition of all the images (in units of electrons) from which the reference was constructed (i.e., the number of electrons in each pixel including the background) added with the total readout noise squared.

Next, the astrometric variance terms are given by:

$$V_{ast}(S_N) = \sigma_x^2 \left(\frac{dS_N}{dx}\right)^2 + \sigma_y^2 \left(\frac{dS_N}{dy}\right)^2, \quad (30)$$

where $\sigma_x$ and $\sigma_y$ are the astrometric registration noise in the x and y axes, respectively, while $$\frac{dS_N}{dx} \text{ and } \frac{dS_N}{dy}$$

are the gradients of $S_N$ in the x and y directions, respectively. Here the Fourier transform of $S_N$ is given by:

$$\hat{S}_N = \hat{k}_n \hat{N}. \quad (31)$$

In a similar manner:

$$V_{ast}(S_R) = \sigma_x^2 \left(\frac{dS_R}{dx}\right)^2 + \sigma_y^2 \left(\frac{dS_R}{dy}\right)^2. \quad (32)$$

Here the Fourier transform of $S_R$ is given by:

$$\hat{S}_R = \hat{k}_r \hat{R}. \quad (33)$$

The origin of these terms is that astrometric noise causes shifts in individual PSFs. The noise induced by these shifts is proportional to the difference between neighboring pixels (i.e., the gradient).

In practice the astrometric registration noise is the root mean square (RMS) of the registration fitting process. This term include both registration errors and the astrometric scintillation noise. In some cases the quality of the registration is position dependent. In this case it is possible to replace the scalars $\sigma_x$ and $\sigma_y$ by matrices of the position-dependent noise. In section § 3.4 a more accurate treatment of the astrometric noise component is provided.

3.4. Accurate Treatment of Astrometric Noise and Flux Variability

Astrometric errors and shifts are a major problem for image subtraction. For example, for a bright source with $10^4$ electrons and full-width at half maximum (FWHM) of 2 pixels, the astrometric error induced by the Poisson noise can be about a few tens of milli-pixels. This is equivalent to the typical astrometric scintillation noise induced by the Earth turbulent atmosphere (as in section § 7.5). Therefore, even in the case of high quality registration, it can be expected that all bright stars may have subtraction residuals, due to astrometric scintillation noise.

Fortunately, due to the closed form and numerical stability of the demonstrated methods, the shape of the subtraction residuals is fully predictable, given the astrometric shift and the flux difference between the star as it appears in the reference and as it appears in the new image. Therefore, it can used to measure the astrometric shift and flux variability for each star.

For adequately sampled images (by adequately sampled images, the PSF width is sampled by at least two pixels; this can be referred to as the Nyquist sampling of the PSF by the camera), this proposed mechanism is accurate, and it allows to measure astrometric shifts and variability in very crowded fields. The details here are provided in a brief outline. The movement and brightness change detection kernel is:

$$\hat{P}_S(\alpha_n, \alpha_r, \Delta x, \Delta y) = (\alpha_r - \alpha_n \hat{s})\hat{P}_D. \quad (34)$$

Here $\alpha_n$ is the flux of the source in N and $\alpha_r$ is its flux in R, and $\hat{s}$ is the shift operator (including sub-pixel shifts) in Fourier space. This operator is a function of the shifts $\Delta x$ and $\Delta y$. Using Eq. 34, one can treat residuals detected in S more carefully than as in section § 3.3. Specifically, one can now perform hypothesis testing to decide between e.g., $H_0$: changes are consistent with stationary and non-variable source; or $H_1$: the star moved or its flux changed. This scheme can be applied to any part of D, for which a significant peak in S is identified (e.g., above 3 $\sigma$). Apart from using this to eliminate false positives, one can now use this to detect and measure new kinds of signals. For example, one can use it to search for moving objects blindly, even in the presence of complex, constant in time, structure in the background.

3.5. Matching the Local Zero Points, Background Flux and Astrometric Shift

The solution so far assumed that the values of the flux-based zero points ($F_n$ and $F_r$), the background levels, ($B_n$ and $B_r$), and the relative astrometric shift ($\Delta x$ and $\Delta y$) are known. Careful analysis of Eq. 13 shows that, in practice, it only deals with the flux zero points ratio:

$$\beta = F_n/F_r, \quad (35)$$

the background difference, $$\gamma = B_n - B_r, \quad (36)$$

and the translation ($\Delta x$, $\Delta y$).

By substituting Eqs. 35 and 36 into D (Eq. 13), and introducing the shift operator one can get the desired expression needed to minimize in order to find $\beta$, $\gamma$, $\Delta x$, and $\Delta y$. This can be done either locally (in small sections of the image), or globally. For simplicity, and as in section § 3.4, here translations are neglected, and in the following it is demonstrated how this can be incorporated.

In order to find $\beta$ and $\gamma$ one the two parts of $\hat{D}$ should be compared:

$$\hat{D}_n(\beta) = \frac{\hat{P}_r \hat{N}}{\sqrt{\sigma_n^2 |\hat{P}_r|^2 + \beta^2 \sigma_r^2 |\hat{P}_n|^2}}, \quad (37)$$

and $$\hat{D}_r(\beta) = \frac{\hat{P}_n \hat{R}}{\sqrt{\sigma_n^2 |\hat{P}_r|^2 + \beta^2 \sigma_r^2 |\hat{P}_n|^2}}. \quad (38)$$

Note that $F_n$ and $F_r$ are replaced with $\beta$. All that is needed is to inverse Fourier transform $\hat{D}_n$ and $\hat{D}_r$, and to solve the following non-linear equation for $\beta$ and $\gamma'$ (and optionally $\Delta x$ and $\Delta y$):

$$D_n(\beta) = \beta D_r(\beta) + \gamma' \quad (39)$$

where $$\gamma' = \frac{\gamma}{\sqrt{\sigma_n^2 + \beta^2 \sigma_r^2}}. \quad (40)$$

Note that the solution should be performed in the image domain. For solving small translations, $\hat{D}_r$ and $\gamma'$ are to be multiplied by the shift operator. If one trusts that the images were background subtracted and aligned correctly, then $\gamma=0$, $\Delta x=0$, $\Delta y=0$ can be set and use the same expression to solve only for the value of $\beta$.

Eq. 39 is non-linear in $\beta$. Therefore iterative solutions are required. For example, in the first iteration set $\beta=1$ and solve for the new value of $\beta$, and use it in the next iteration to find a new value of $\beta$, until convergence (it was found that usually $\beta$ converges in 2-3 iterations). Furthermore, it is important to note that one must use robust fitting methods in order to solve Eq. 39. The reason is that there may be bad pixels, particle hits, astrometric noise, and saturated pixels in the images. It is also recommended to remove the images-edge pixels prior to fitting $\beta$.

3.6. PSF Photometry in the Difference Image

In this section a statistic for measuring the PSF photometry of a source in the difference image is demonstrated (PSF photometry refers to effectively fitting the source with a PSF). This measurement statistic is unbiased and has maximal S/N among all estimators, which are linear combinations of the input images. In addition, this measurement statistic is also the maximum likelihood estimate for the flux of point-source transients. However, this statistic is optimal only for the background-dominated-noise limit. A full derivation of this statistic is demonstrated in section § 12.

The best linear estimator for the PSF photometry of a source at position q is:

$$\alpha(\hat{q}) = \frac{S(q)}{F_S}. \quad (41)$$

Here $F_S$ is the flux normalization of S:

$$F_S = \sum_f \frac{F_n^2 |\hat{P}_n|^2 F_r^2 |\hat{P}_r|^2}{\sigma_r^2 F_n^2 |\hat{P}_n|^2 + \sigma_n^2 F_r^2 |\hat{P}_r|^2}, \quad (42)$$

where $f$ indicates spatial frequencies.

The standard deviation of this estimator is:

$$\sigma_{\alpha(\hat{q})} = \frac{\sqrt{V(S_N) + V(S_R)}}{F_S}, \quad (43)$$

where $V(S_N)$ and $V(S_R)$ are defined in Eqs. 26-27. Note that Eq. 41 can be used to measure the PSF flux of all the transients in the image simultaneously.

3.7. Cosmic Ray, "Bad" Pixel and Ghosts Identification

The image subtraction statistic D can be used to identify cosmic rays and "bad" pixels. A major advantage of using the proper image subtraction over other image-differencing techniques is that its pixels noise is uncorrelated and usually it roughly preserves the shape of sources, which are similar to $\delta$-functions. This means that in most cases one can identify particle hits by applying edge-detection algorithms (e.g., van-Dokkum 2001, *PASP*, 113, 1420), without any modifications, directly on D.

An alternative approach is to use a rough model for the shapes of particle hits and "bad" pixels, and to perform a composite hypothesis testing. The log-likelihood of observing D, if an object at position q is a point source transient ($H_{ps}$ hypothesis) with flux $\alpha$, is given by:

$$-\log(P(D | H_{ps}(q))) = \sum_x \left\| D - \alpha F_D \overline{P}_D \otimes \delta(q) \right\|^2, \quad (44)$$

while the log-likelihood of D if the object at position q is a cosmic ray with flux $\alpha$ and with shape $P_{cr}$ in N, ($H_{cr}$ hypothesis) is:

$$-\log(P(D | H_{cr}(q))) = \sum_x \left\| D - \alpha P_{cr} \otimes \overline{P}_{D_N} \otimes \delta(q) \right\|^2. \quad (45)$$

Here x is the subset of pixels that contain the source of interest (e.g., an area with a width twice that of the PSF around the source). The difference between Eqs. 44 and 45 (using appropriate priors, such as the probability of seeing a transient at a certain magnitude and the probability of seeing a cosmic ray with this flux) is a statistic that can be indicative (after setting the appropriate threshold) for deciding, whether the detected transient is a cosmic ray, or an astronomical transient. In this case the flux of the source, and the intensity and shape of the cosmic ray are free parameters of the model. Therefore, this is a classic case of composite hypothesis testing.

The same approach can be used to identify internal-reflection ghosts. In this case, the shape $P_{cr}$ is replaced with the shape of a reflection ghost. For example, an extended kernel (e.g., top hat filter), which is wider than the stellar PSF.

4. Properties of the New Image Subtraction Method

Now, with an optimal solution for the subtraction problem, properties are to be analyzed and compared with other methods, for seeking an intuitive understanding.

4.1. Optimality

The image subtraction and transient detection formulae were derived using the lemma of Neyman & Pearson. This ensures that whenever assumptions are correct, the method is optimal. The assumptions: the images are registered, dominated by uncorrelated Gaussian background noise, and that the PSFs, background, variance and flux-based zero points are known.

4.2 the Constant-in-Time Image T Cancels

For perfectly registered images, both the optimal proper difference image (D) and transient detection image (S) are free of subtraction residuals from the constant-in-time image. This is because the constant-in-time image T algebraically vanishes.

This is not the case in the subtraction methods suggested by Alard & Lupton and Bramich 2008. In these methods an optimum for the trade-off between magnifying the image noise and minimizing the constant-in-time residuals of T was explored

4.3. Numerical Stability

By inspecting Eqs. 12, 13 and 14, it is apparent that, if the denominator is approaching zero, then the numerator is approaching zero even faster. Therefore, the image subtraction method is numerically stable for all combinations of PSFs for the new and reference images.

It should be noted that the methods of Alard & Lupton and Bramich 2008 are numerically unstable in the general case, as these methods effectively perform deconvolution. It is true that if the PSF of the reference image is narrower, in all axes, than the PSF of the new image, then the Alard & Lupton family of methods are stable.

However, even in this case the solution found by these methods is sub-optimal (i.e., it does not maximize the S/N of the transients). Further, Eqs. 12, 13 and 14 are numerically stable even if the PSFs used have large (even order unity) errors compared to their true value. Therefore, no special accuracy is required in measuring the PSFs because of the division in Fourier plane; further demonstrated in section § 6.

4.4. Locality

When computing S and D, the only operations performed are convolutions of R and N with small kernels. Therefore, Sand D can be calculated independently for every small image patch, (up to few times the PSF size). This allows the used PSFs for subtraction to vary smoothly across the image. In addition, local artifacts such as "bad" pixels, particle hits or saturated stars can affect only their close vicinity.

4.5. The Proper Image Subtraction D has White Noise

In the expression for $\hat{D}$ (Eq. 13), in the background-noise dominated limit, the variance of the numerator is equal to the square of the denominator, i.e.:

$$V[F_r \hat{P}_r \hat{N} - F_n \hat{P}_n \hat{R}] = \sigma_r^2 F_n^2 |\hat{P}_n|^2 + \sigma_n^2 F_r^2 |\hat{P}_r|^2, \tag{46}$$

which means that all the spatial frequencies of $\hat{D}$ have equal variance. Furthermore, since it is assumed that the images have white noise, their Fourier transform has white noise. This means that the spatial frequencies of $\hat{D}$, as a linear combination of $\hat{R}$, $\hat{N}$, has un-correlated noise. Together, both properties mean that $\hat{D}$ has white noise, which means that D has also white noise. In other words, the difference image is a proper image, as in Zackay & Ofek 2015b. This property is violated by all the other methods for image subtraction.

It should be noted that the vicinity of bright stars, where the source noise variance is dominant, the proper subtraction image D exhibits correlated noise. The simulations suggest that if the source variance is at least an order of magnitude higher than the background variance, than correlated noise is detectable by eye in the vicinity of such sources. However, as stated before, using this method, the source noise is controllable via variance corrections.

4.6. D and $P_D$ are Sufficient for any Measurement or Decision on the Difference Between the Images Section § 13 provides a proof that D and $P_D$ constitute a sufficient statistic for any measurement or hypothesis testing on the difference between the images. The key ingredients for this proof are that any likelihood calculation for any generative model for the difference between the images can be computed by using only these quantities, and the use of the Fisher-Neyman factorization theorem [Fisher 1922 *"On the Mathematical Foundations of Theoretical Statistics Fisher Phil. Trans. R. Soc. Lond. A* 1922, 222, 309-368, DOI.: 10.1098/rsta.1922.0009. Pub. 1 January; Neyman 1935 Neyman, J. (1935) *"Sur un teorema concernente le cosidette statistiche sufficienti". Giorn. Ist. Ital. Att.*, 6:320-334.] It is noted that there are infinite number of sufficient statistics with respect to the image subtraction problem. Here the proper subtraction image D is preferred (rather than e.g., S), due to its useful properties.

The sufficiency property has important practical consequences. It means that, in the background-noise dominated limit, D and $P_D$ contain all the information one needs for any further measurement or hypothesis testing related to the difference between the images. There is no need for other types of difference images for other applications. Examples for practical applications include the identification and removal of particle hits on the detector (section § 3.7); optimal search for proper motion, astrometric shifts (section § 3.4) and asteroid streaks.

4.7. Symmetry Between the New Image and the Reference Image

The problem of image subtraction is symmetric to the exchange of the reference and the new image (up to negation of the flux of the transient). Therefore, the optimal image subtraction statistics (D or S) are symmetric to the exchange of R and N (up to a minus sign). This property is violated by the solutions proposed by Phillips & Davis, Alard & Lupton, and Bramich 2008.

4.8. The Limit of Noiseless Reference Image

In the limit of $\sigma_r \to 0$ Eq. 12 becomes:

$$\lim_{\sigma_r \to 0} \hat{S} = \frac{F_n F_r^2 \overline{\hat{P}_n} |\hat{P}_r|^2 \hat{N} - F_r F_n^2 \overline{\hat{P}_r} |\hat{P}_n|^2 \hat{R}}{\sigma_n^2 F_r^2 |\hat{P}_r|^2} \quad (47)$$

$$= \frac{F_n \overline{\hat{P}_n}}{\sigma_n^2} \left( \hat{N} - \frac{F_n \hat{P}_n}{F_r \hat{P}_r} \hat{R} \right). \quad (48)$$

The term $\hat{P}_n/\hat{P}_r$ can be identified as the convolution kernel solved for by the methods of Phillips & Davis, Alard & Lupton and Bramich 2008. Therefore, in this limit, S converges to the Alard & Lupton family of methods, followed by filtering each of the images with the PSF of the new image.

This simple analysis demonstrates that the Alard & Lupton family of methods, if followed by the correct matched filtering, is a special case of the current solution S. Furthermore, Eq. 48 provides the prescription for the correct matched filter (only) in the limit of $\sigma_r \to 0$.

To emphasize the importance of correctly accounting for the noise in the reference image R, some numbers are substituted into the formulas. For a very good reference images, $\sigma_r \to 0.1\sigma_n$ (which represents a reference image composed of the coaddition of ~100 images).

Because the ratio $$\frac{\hat{P}_n}{\hat{P}_r}$$

can be much larger than $$\frac{\sigma_n}{\sigma_r}$$

(for example, if $P_n$ is narrower than $P_r$, in the high spatial frequencies this ratio can easily get to $10^6$), $\sigma_r$ is never small enough to be negligible. This means that the Alard & Lupton family of solutions are qualitatively close to the correct statistic only if $$\frac{|\hat{P}_n|}{|\hat{P}_r|} \ll \frac{\sigma_n}{\sigma_r}.$$

In any other case, these solutions can produce either deconvolution artifacts, or fail to cancel the constant in time image T.

4.9. The PSF of the Difference Image

The PSF, $P_D$, of the proper subtraction image is a combination of $P_n$ and $P_r$. FIGS. 3A-3I demonstrate $P_n$, $P_r$ and the corresponding $P_D$ for three cases, of symmetric Gaussians (FIGS. 3A-3C), a-symmetric Gaussians (FIGS. 3D-3F), and speckle (FIGS. 3G-3I) images. $P_n$ (left column), $P_r$ (middle column) and the corresponding $P_D$ (right column) for the three cases. The first row (FIGS. 3A-3C) is for the case of symmetric Gaussian PSFs with sigma-width of 2 and 3 pix for the new and reference, respectively. The second row (FIGS. 3D-3F) is for the case of a-symmetric Gaussian PSFs with sigma-width of 2 by 4 pix and 4 by 2 pix for the new and reference, respectively. In the third row (FIGS. 3G-3I) $P_n$ and $P_r$ are simulated speckle images (using the tools in as in [Ofek 2014 *Astrophysics Source Code Library*, ascl:1407.005]). In the speckle simulations it is set $D_{tel}/r_0 = 20$, where $D_{tel}$ is the telescope diameter and $r_0$ is the Fried length.

4.10. Knowledge of the PSFs

According to some of the provided methods the PSFs of the images should be known, while in the Alard & Lupton family of methods solve for the convolution kernel $\hat{P}_n/\hat{P}_r$ without measuring the PSFs.

One can write the expression for (a slightly changed) D with $\hat{P}_n/\hat{P}_r$, allowing to incorporate relative knowledge of the PSFs.

$$\hat{D}_{ratio} = \frac{\hat{N} - \frac{F_n \hat{P}_n}{F_r \hat{P}_r} \hat{R}}{\sqrt{\sigma_n^2 + \sigma_r^2 \frac{F_n^2 |\hat{P}_n|^2}{F_r^2 |\hat{P}_r|^2}}}. \quad (49)$$

In this case, $D_{ratio}$ has the following PSF:

$$P_{\hat{D}_{ratio}} = \frac{F_r F_n \hat{P}_n}{F_D \sqrt{\sigma_n^2 + \sigma_r^2 \frac{F_n^2 |\hat{P}_n|^2}{F_r^2 |\hat{P}_r|^2}}}. \quad (50)$$

Inspecting these slightly modified definitions of D and $P_D$ still yields $S = D_{ratio} \otimes \overrightarrow{P_{D_{ratio}}}$, and is thus equivalent to the original definition (Eq. 13). It is important to note, that the estimation of $P_{D_{ratio}}$ is still required (and thus, effectively that of $P_n$ and $P_r$) for performing transient detection, the required precision in estimating $P_{D_{ratio}}$ is much less demanding than the required precision in estimation of the PSF ratio. In fact, even crude estimation of the general form of $P_{D_{ratio}}$ as a two dimensional Gaussian may result only in a negligible sensitivity loss. Therefore, if the individual PSFs cannot be estimated from the images, but their ratio can be (for example, if only extended, or complex sources are present in the field of view), it is still possible to optimally subtract the images and detect transients with maximal sensitivity. Therefore, current requirement for the knowledge of the PSFs should not be considered as a drawback, as it could be bypassed.

The problem of solving $$\frac{\hat{P}_n}{\hat{P}_r}$$

is that astrometric scintillation noise shuffles the relative position of sources in the new and reference images, biasing the solution for $$\frac{\hat{P}_n}{\hat{P}_r}$$

to be wider, and thus less accurate. This effect may degrade the cancellation quality of T, and thus may reduce the achievable contrast between T and the detectable transients. This effect is avoided when estimating $P_r$ and $P_n$ separately because astrometric noise is locally coherent, allowing the approach demonstrated in section § 3.4.

4.11. Registration and Color-Refraction Errors

Image subtraction relies on many steps taken prior to the differencing process. Any noise introduced by the pre-processing steps can be propagated into the final subtraction image. Examples for such problems include: registration errors, color-refraction systematic errors, and small-scale flat-fielding errors.

Here are provided two types of treatments/solutions for such noise:

(1) It is straightforward to introduce these extra sources of noise into the variance image of S and use it to calculate $S_{corr}$ (section § 6.1 for examples). This correction is sub-optimal, but it is resilient to pre-processing errors;

(2) An accurate treatment of the problem is to fit any astrometric shift and flux variation for each detected artifact in the difference image D (section § 3.4). Albeit this is computationally expensive, this kind of solution is very common in astronomy (e.g., DAOPHOT, Stetson 1987 *PASP*, 99, 191; DOPHOT, Schechter et al. 1993, *PASP*, 105, 1342).

4.12. Free Parameters

In some embodiments, the method do not have any free parameters that the user needs to set. The methods of Alard & Lupton, Bramich 2008, and Yuan & Akerlof have internal degrees of freedom that the user needs to define and that may influence the final outcome. For example, the Bramich 2008 method may be sensitive to the kernel size, while the Alard & Lupton method depends on the basis functions one chooses to represent the convolution kernel (e.g., Becker [Becker, Homrighausen, Connolly, et al. 2012, 425, 1341] and Bramich et al. 2015 [Bramich, Home, Alsubai, et al. 2015, arXiv:1512.04655]).

4.13. Computational Complexity

In terms of computational complexity, some embodiments of the subtraction method are fast, as the most demanding operation in the image subtraction method is the FFT operation (or alternatively convolution with a small kernel). Tests indicate that the current algorithm is at least an order of magnitude faster than the inversion algorithms by Alard & Lupton and Bramich 2008, as they are essentially solving a linear least square problem, with a large number of equations and tens to hundreds of unknowns.

5. Summary of Algorithm

In some embodiments it is recommended to perform the subtraction on small image patches, in order to minimize residual astrometric shifts, inhomogeneous transparency and background. In addition, it allows using position-dependent PSFs. The image patches are to be overlapping, by at least two PSF lengths, in each dimension, in order to avoid edge effects of the convolution process.

Here demonstrated is a step-by-step outline of a suggested algorithm:

Input Arguments:
N—background subtracted new image (registered to R).
R—background subtracted reference image.
$N_b$—new image, including background in electron units.
$R_b$—reference image including background in electron units.
$P_n$—PSF of new image normalized to have unit sum.
$P_r$—PSF of reference image normalized to have unit sum.
$\sigma_n$—STD of the background of the new image.
$\sigma_r$—STD of the background of the reference image.
$r_n$—read noise of new image in electrons.
$r_r$—read noise of reference image in electrons.
$\sigma_x$—RMS (in pixels) of the astrometric registration solution in the X-axis; either a scalar or a matrix.
$\sigma_y$—RMS (in pixels) of the astrometric registration solution in the Y-axis; either a scalar or a matrix.

Output:
D—The proper difference image.
$P_D$—The PSF of the proper difference image.
$S_{corr}$—The matched filter difference image corrected for source noise and astrometric noise.
$P_{D_n}$—The PSF of a delta function in N as it appears in D.
$P_{D_r}$—The PSF of a delta function in R as it appears in D.

Algorithm:
1. Optionally constructing a reference image (R; Eq. 22), its PSF ($P_r$; Eq. 23) and flux ($F_r$; Eq. 24) using the Zackay & Ofek 2015b proper coaddition method.
2. Solving Eq. 39 for the best-fit value of β and optionally γ, Δx, and Δy (need to use Eqs. 37 and 38); since this Equation is non-linear in β use iterations; setting β=1 in the first iteration, updating the value of β and continue until convergence; using robust fitting (robust fitting is less sensitive to outliers; an example for a robust fitter is the robustfit.m function in MATLAB.); alternatively, finding β using other methods (e.g., relative photometry).
3. If applicable calculating γ (Eq. 40) and subtracting γ from N.
4. If applicable, shifting $P_n$ by Δx and Δy.
5. Setting $F_r=1$ and $F_n=\beta$.
6. Calculating $\hat{D}$ (Eq. 13).
7. Calculating $\hat{P}_D$ (Eq. 14).
8.

Calculating $\hat{S} = \overline{\hat{P}_D}\hat{D}$.

9. Calculating $\hat{P}_{D_n}$ (Eqs. 18 and 130).
10. Calculating $\hat{P}_{D_r}$ (Eqs. 19 and 134).
11. Calculating $k_r$ (Eq. 28).
12. Calculating $k_n$ (Eq. 29).
13. Setting $V(\varepsilon_n)=N_b+r_n^2$ and calculating $V(S_N)$ (Eq. 26).
14. Setting $V(\varepsilon_r)=R_b+r_r^2$ and calculating $V(S_R)$ (Eq. 27); if R is composed of multiple images, it is better to sum up the $V(S_R)$ of the individual reference images (section § 11 and Eq. 101).
15. Calculating $V_{ast}(S_N)$ (Eqs. 30 and 31).
16. Calculating $V_{ast}(S_R)$ (Eqs. 32 and 33).
17. Calculating $S_{corr}$ (Eq. 25); as a sanity checking, the (robust) STD of $S_{corr}$ should be ≈1.
18. Searching for local maxima in $S_{corr}$—the peak value corresponds to the significance of the transient in units of Sigmas.
19. As an alternative to steps 15 and 16, searching all locations in D that correspond to statistically significant sources in $S_{corr}$ (without astrometric contributions) for moving point sources, using $P_S$(Eq. 34), measure their flux and astrometric variability and subtract them.
20. Selecting remaining sources, with significance larger than some threshold, determined from the desired false alarm probability.
21. Calculating the flux of the transient candidates, using Eqs. 41, 42, and 43.

It is noted that all Fourier transforms herein are circular, and any statistic computation should be regarded only on positions sufficiently far from the borders of the image (i.e., typically a few times the PSF width).

6. Tests 1 and 2

There are several important challenges in testing any image differencing algorithm. Image subtraction in general is affected by many factors. Therefore, it is desirable to separate between external problems (e.g., non-perfect registration) and issues related to the subtraction itself (e.g., numerical stability). Therefore, both simulations and real data are used to test the image differencing algorithm.

It is worthwhile to compare the new algorithm with existing methods. However, such a comparison is problematic, as other methods do not specify the matched filter for source detection. Furthermore, some of these methods depend on the selection of basic functions and kernel size. In addition, there are several ways to solve a system of linear equations (e.g., SVD) and these may influence the final outcome. Therefore, here the comparison with other methods is limited.

Section § 6.1 demonstrates tests based on simulated data, while section § 6.2 discusses real images.

6.1. Simulations

An important feature of the algorithm is its numerical stability. The best way to test this is on simulations, as the input is fully controlled.

Images of 512 by 512 pixels size were simulated, with background level of 300 electrons, with Poisson noise. In each image 100 stars were simulated, with integrated flux taken from a flat distribution between 0 and $10^5$ electrons and Poisson noise. In addition nine transient sources were added to the new image with position and flux as listed in Table 1. In the first set of simulated images the PSF of the sources in the images are symmetric Gaussians with sigma-width of 2 and 3 pixels, for the reference and new images, respectively.

TABLE 1

Simulated transients in the new image

| X (pix) | Y (pix) | Flux (electrons) |
|---|---|---|
| 100 | 100 | 1500 |
| 120 | 120 | 1600 |
| 140 | 140 | 1800 |
| 160 | 160 | 2000 |
| 180 | 180 | 2200 |
| 200 | 200 | 2400 |
| 220 | 220 | 2600 |
| 240 | 240 | 2800 |
| 260 | 260 | 3000 |

Note:
the position and mean flux of simulated transient sources, as in the new images of FIGS. 4-6

FIGS. 4A-4F conceptually demonstrate subtraction of simulated images with symmetric Gaussian PSF with sigma-width of 2 and 3 pixels, for the reference and new images, respectively, Top row (left to right): new image (FIG. 4A), the reference image (FIG. 4B), the proper subtraction image (D) (FIG. 4C); Bottom row (left to right): the matched-filtered image (S) threshold above 5-σ (FIG. 4D), the Alard & Lupton subtraction of new minus reference (FIG. 4E), and the Alard & Lupton subtraction of reference minus new (FIG. 4F). The positions of the simulated transient sources, in the thresholded matched filtered image, are marked with red circles. All the images are demonstrated with inverted grayscale map. The Alard & Lupton subtractions are based on the ISIS software Alard & Lupton. This Figure demonstrates that while the image subtraction method is symmetric, the Alard & Lupton algorithm is not symmetric. In this case it is working well in one direction, but subtraction artifacts are clearly visible (ringing due to deconvolution) in the other direction. Furthermore, thresholding the matched filter image above 5-σ reveals only the simulated transients.

In FIGS. 5A-5F images are simulated, with the same parameters as in FIGS. 4A-4F, with a-symmetric Gaussian PSF with sigma width of 2 by 4 pix in the new image and 4 by 2 pix in the reference image. Features of FIGS. 5A-5F, are the similar to FIGS. 4A-4F, but for these images. Again, the a-symmetry of the Alard & Lupton family of methods is seen. Furthermore, in this case the ringing due to deconvolution is seen in both the N–R and R–N subtractions.

One of the most important practical features of the new method is the ability to incorporate other types of noise into the detection process (e.g., source noise, astrometric noise, color-refraction noise). To demonstrate this, the first simulation (FIGS. 4A-4F) is repeated, but this time with normally distributed astrometric noise with standard deviation of 0.3 pix.

FIGS. 6A-6F conceptually demonstrate subtraction of simulated images with 0.3 pix (RMS) astrometric noise and symmetric Gaussian PSF with sigma-width of 2 and 3 pixels, for the reference and new images, respectively. Top row (left to right): the new image (FIG. 6A), the reference image (FIG. 6B), the proper subtraction image (D) (FIG. 6C); bottom row (left to right): the matched-filtered image (S) thresholded above 5-σ (FIG. 6D), the source noise corrected and astrometric noise corrected matched-filtered image ($S_{corr}$) thresholded above 5-σ (FIG. 6E), and the Alard & Lupton subtraction of the new minus reference (FIG. 6F). The positions of the simulated transient sources, in the thresholded matched filtered image, are marked by red circles. In this case, the subtraction contains a large number of positive-negative residuals, but the $S_{corr}$ image deals well with this astrometric noise, and only the simulated transients are detected.

6.2. Tests on Real Images

The new methods were further tested on imaging data available from the Palomar Transient Factory [PTF1[17]; Law et al. 2009; Rau et al. 2009] data release 2. The image processing is described in [Laher et al. 2014, PASP, 126, 674] while the photometric calibration is discussed in [Ofek et al., 2012, PASP, 124, 62].

Table 1 lists the various images on which the algorithm was tested. Registration, background subtraction and PSF estimation were performed.

FIGS. 7A-7F conceptually demonstrate image subtraction results for test 1 (Table 2). Top row (left to right): the new image (FIG. 7A), the reference image (FIG. 7B), the proper subtraction image D (FIG. 7C); Bottom row (left to right): the matched filter corrected difference image ($S_{corr}$) filtered at 5-σ (FIG. 7D), the Alard & Lupton ISIS subtraction of the new minus the reference (FIG. 7E), and the ISIS subtraction of the reference minus the new (R–N) (FIG. 7F).

Figure 8:
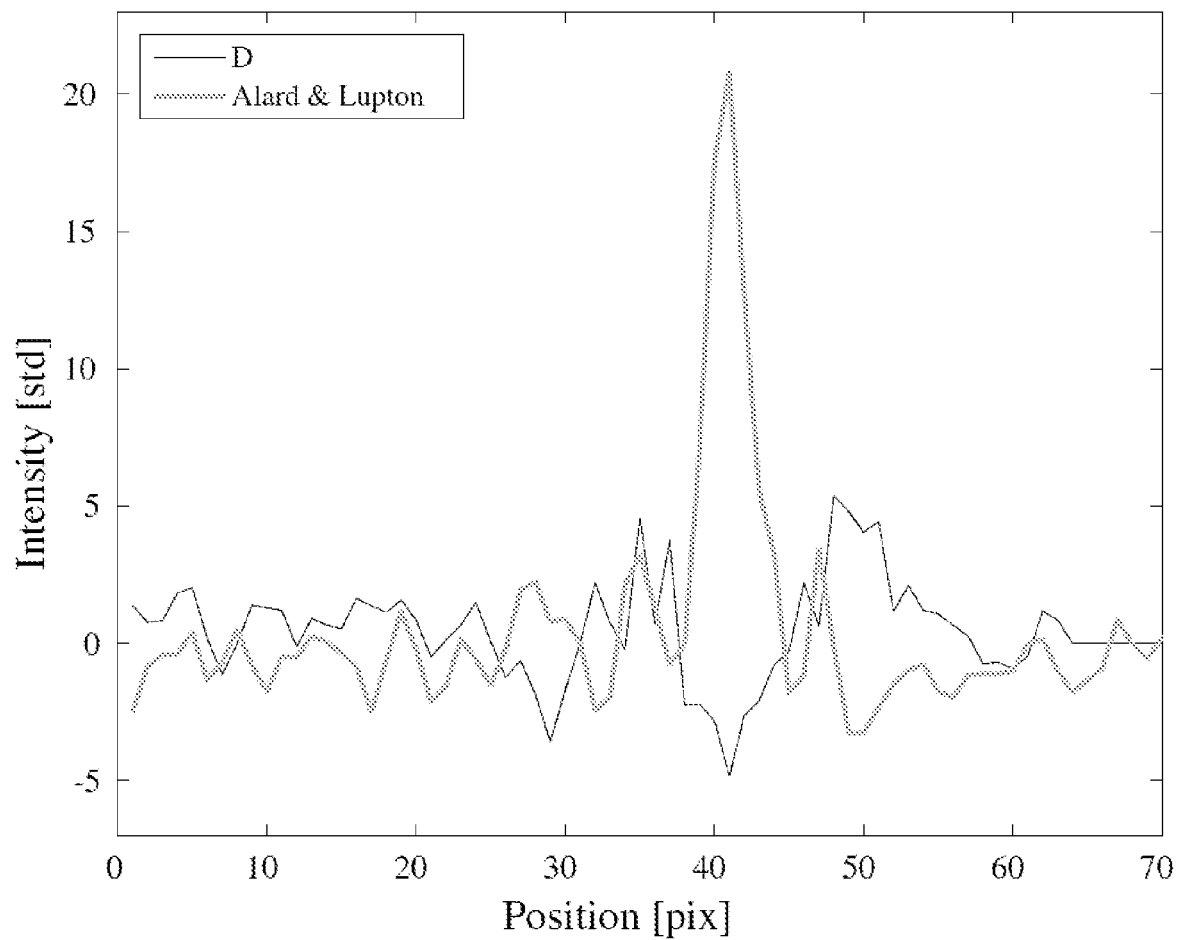
FIG. 8 conceptually demonstrates a profile cut, at the position of the red line, as in FIG. 7A, in the proper subtraction image D (black line) and the Alard & Lupton subtraction (N–R; gray line)

All the images are presented with inverted grayscale map. The red line (in the new panel) indicates the position of the profile cut presented in FIG. 8. In the $S_{corr}$>5 map, CR1-CR5 indicate the position of cosmic rays detected by the current algorithm, while the two bright residuals on the right part of the image are due to saturated stars. The residual at the top left has a significance of 5.7-σ and it is at the interface between two bright stars. The mechanism that generates this particular residual is discussed in section § 7.7.

FIGS. 7A-7F further demonstrate that the Alard & Lupton subtraction is not symmetric to the exchange of R and N, while the current method is symmetric. Specifically, the R–N image of the Alard & Lupton has strong, and high amplitude, correlated noise.

TABLE 2

List of tests on real images

| Test | Field/CCD | Size (pix) | N | R | $FWHM_N$ (arcsec) | $FWHM_R$ (arcsec) |
|------|-----------|------------|---|---|-------------------|-------------------|
| 1 | 100031/04 | 560 × 560 | 2012-12-20.4134 | proper | 5.4 | 2.9 |
| 2 | 100031/11 | 1000 × 1000 | 2011-08-08.1839 | 2011-04-12.1865 | 2.5 | 2.9 |

Note:
list of tests on real images; "proper" indicates a reference image that was constructed using proper coaddition Zackay & Ofek(2015b)

On first glance, the Alard & Lupton N–R image looks cosmetically good. However, on closer inspection one can note that this image has subtraction residuals with large amplitude. For example, FIG. 8 demonstrates a profile cut, at the location of the red line as in FIG. 7A, in the proper subtraction image D and the Alard & Lupton subtraction (N–R).

The images are normalized such that the standard deviation of the images is unity (one). This demonstrates that in the presence of bright stars, the fluctuations in the currently demonstrated subtraction image are modest, while the residuals in the Alard & Lupton subtractions are large. Note that the D image is not filtered while the Alard & Lupton subtraction is partially filtered. Therefore, the noise properties of D, relative to the Alard & Lupton subtraction, are even better than indicated from this plot. Accordingly, FIG. 8 clearly demonstrates that while the currently presented algorithm behaves very well in the presence of stars, the Alard & Lupton subtraction has very large fluctuations. Note that the fact that the Alard & Lupton subtraction image is partially filtered is seen by eye (i.e., smoother noise)

FIG. 9A-9F conceptually demonstrate image subtraction results for test 2 images (Table 2); the same as FIGS. 7A-7F, but for the test 2 images (Table 2), containing the bright galaxy M51 and SN 2011dh. The detected sources in $S_{corr}$>5 are SN 2011dh, particle hits and "bad" pixels.

These images contain the bright galaxy M51, and SN 2011dh (Arcavi 2011). Note that in D residuals are clearly seen, due to mis-alignment of the images. However, these residuals are gone when $S_{corr}$ is presented where since it takes the source noise and astrometric noise (about 0.2" rms) into account. Further note that the astrometric residuals are less pronounced in the Alard & Lupton subtraction simply because these images are partially filtered, and therefore smoother. The transient candidates detected in the $S_{corr}$ image above 5-σ threshold are: SN 2011dh, cosmic rays and "bad" pixels. S and $S_{corr}$ are demonstrated in FIGS. 10A and 10B in order to give an impression on the importance of correcting S before detecting transients. Note that S and $S_{corr}$ contain correlated noise, and may mislead the human eye.

Figure 9A:
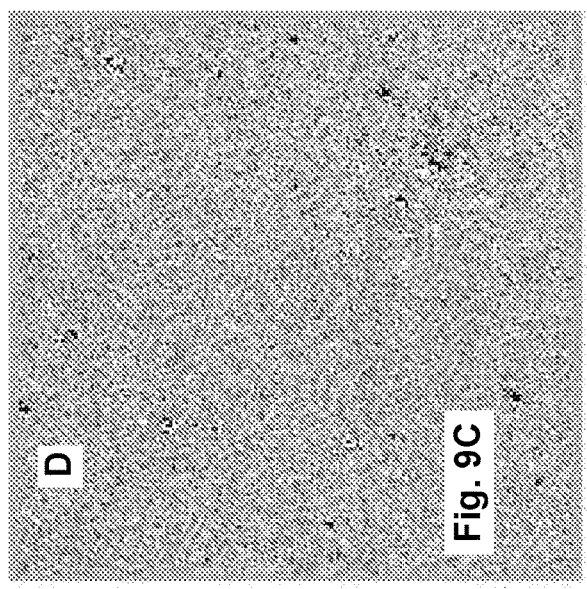
FIGS. 9A, 9B, 9C, 9D, 9E and 9F conceptually demonstrate image subtraction results, for test 2 images (Table 2)
Figure 9B:
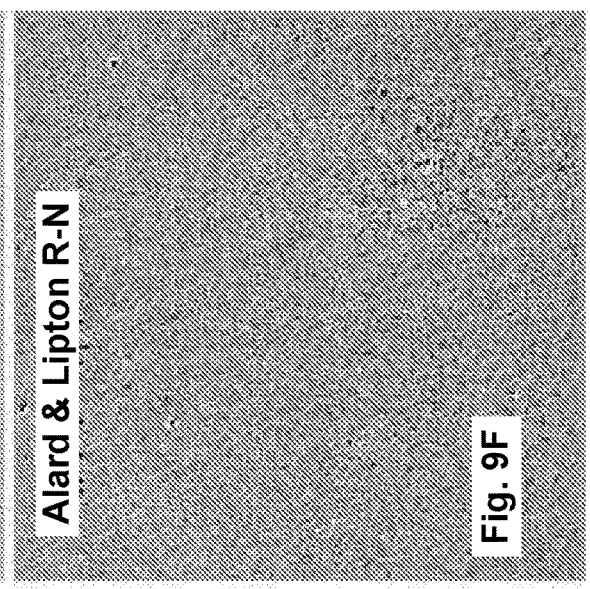
Figure 9C:
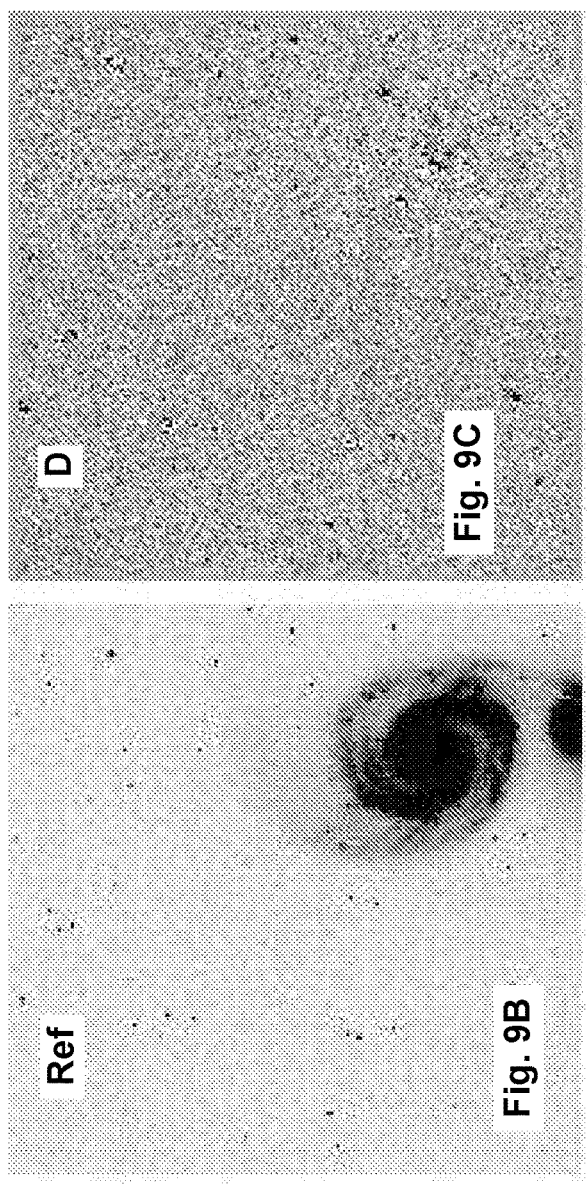
Figure 9D:
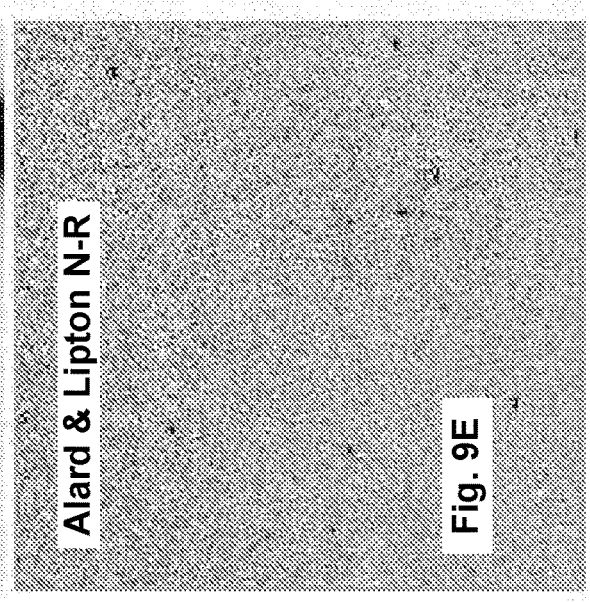
Figure 9E:
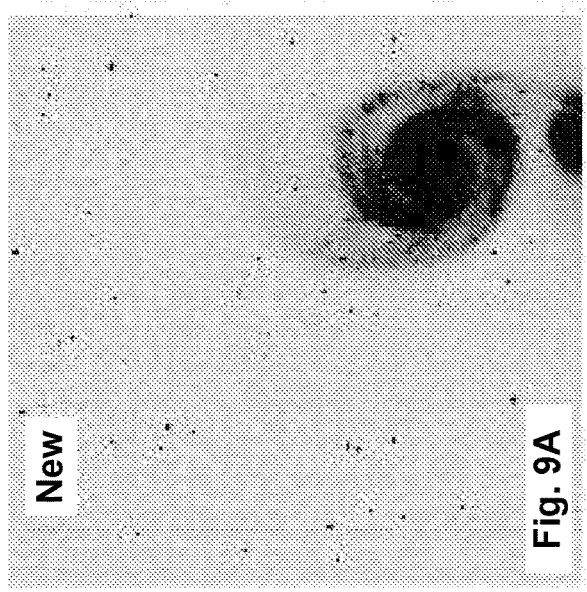
Figure 9F:
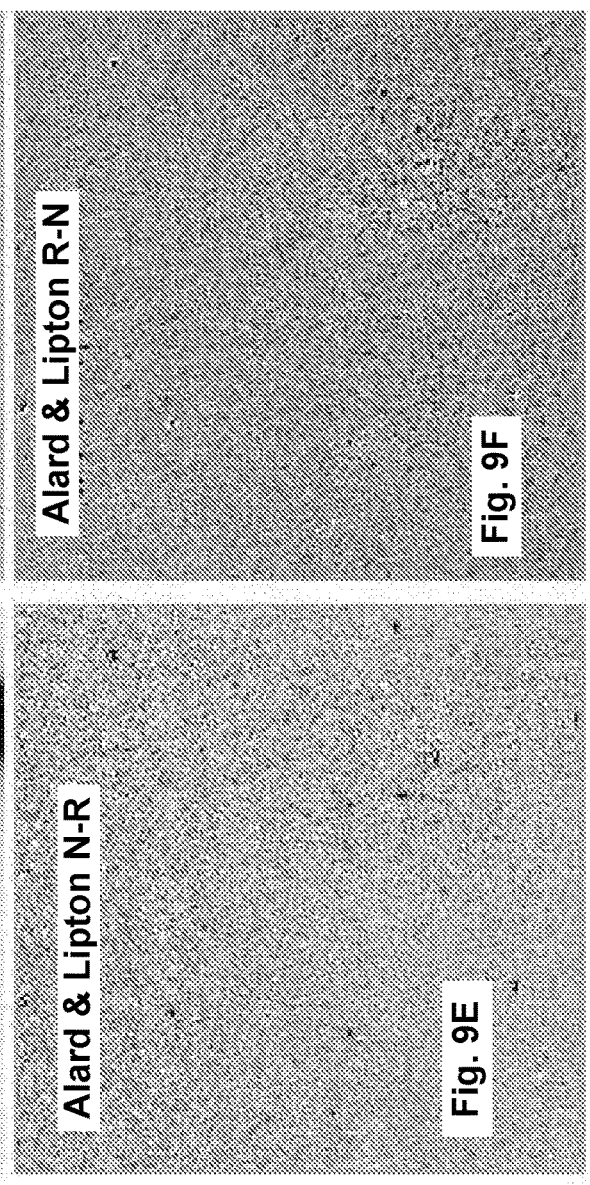
Figures 10A, 10B:
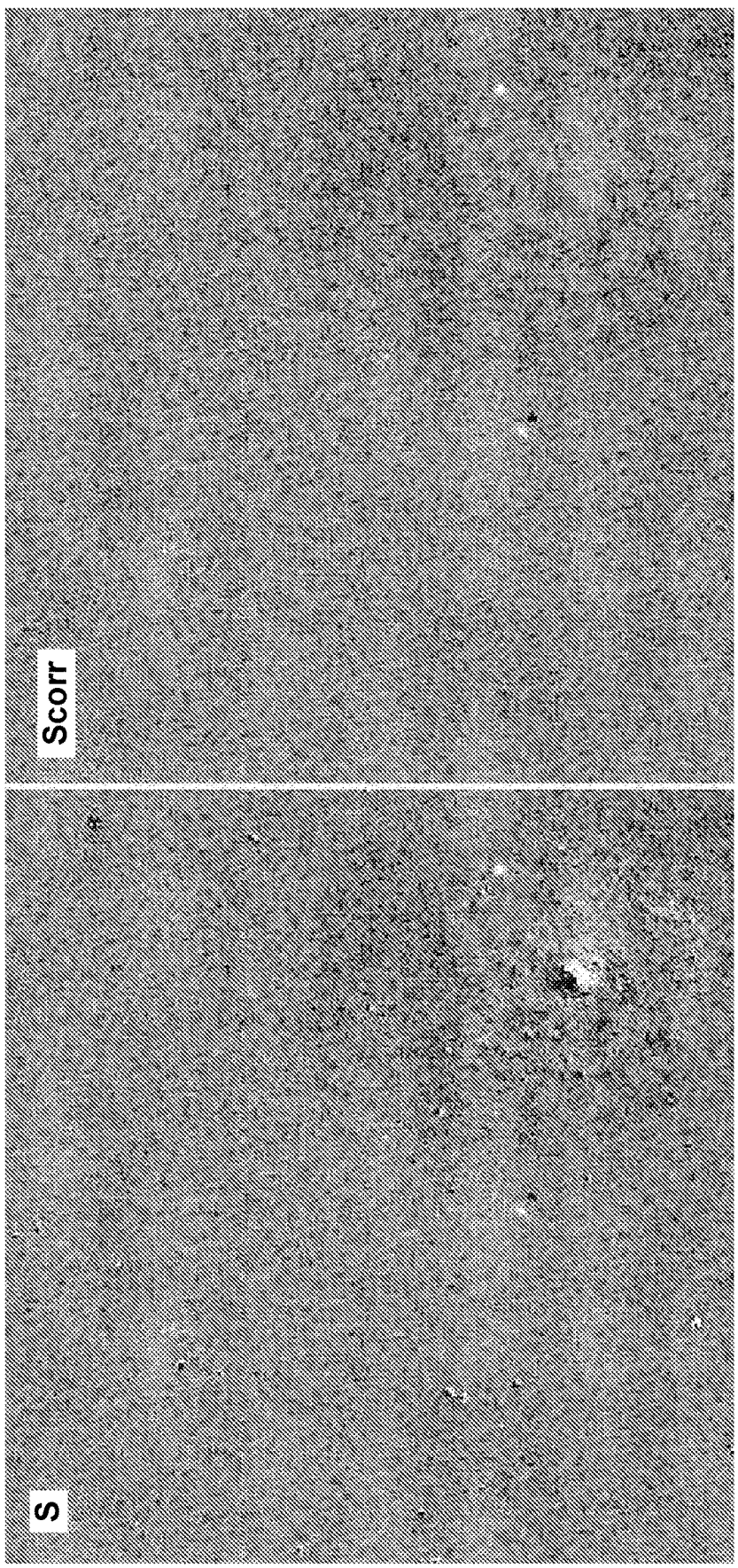
FIGS. 10A and 10B conceptually demonstrate the score map S (FIG. 10A) and the corrected score map $S_{corr}$ (FIG. 10B) corresponding to the subtraction shown in FIG. 9A-9F.

FIGS. 10A and 10B, conceptually demonstrate the score map S (FIG. 10A) and the corrected score map $S_{corr}$ (FIG. 10B) corresponding to the subtraction shown in FIG. 9A-. Note that albeit a substantial registration error (that could have been done better), the corrected image does not contain false alarms. Also note that in S it is very difficult to distinguish between an image artifact to a real source, while in D it is almost trivial. Note that S and $S_{corr}$ are images with correlated noise. Detecting sources in S and $S_{corr}$ should be done by searching for local maxima and reading their value. The value of the local maxima divided by the (local) standard deviation corresponds to the detection significance in units of Sigmas (or more formally to the false alarm probability via the survival function of the normal distribution). Images grayscale is between −7 and +7 standard deviations of the images, with the exception of SN 2011dh (FIGS. 9A-9F), all the significant residuals are due to cosmic rays and bad pixels.

7. Implementation Details

Given background subtracted images, their variance, PSF and flux-based zero points ratio, the disclosed image subtraction method is demonstrated using closed-form formula. Therefore, the implementation of this method is simple and rigorous, and does not require special attention. However, like any other method for image subtraction, this technique is sensitive to the steps taken prior to the image subtraction (e.g., registration; flux matching).

7.1. Background and Variance Estimation

The background and variance in real wide-field-of-view astronomical images cannot be treated as constants over the entire field of view. Therefore, it is suggested to estimate them locally and interpolate. To estimate the background and variance one needs to make sure that the estimators are not biased by stars or galaxies. Following Zackay & Ofek (2015a, 2015b) it is suggested to fit a Gaussian to the histogram of the image pixels in small regions (currently using 256×256 arcsec² blocks), and to reject from the fitting process pixels with high values (e.g., the upper 10% of pixel values). Regions containing large galaxies or complex background may require special treatment.

7.2. PSF Estimation and Spatial Variations

Note that Eqs. 12 and 13 are roughly linear to perturbations in the PSF, compared with the real PSF. Among the complications that may affect the PSF measurement are pixelization, interpolation and the resampling grid. Furthermore, the PSF is likely not constant spatially and it also may change with intensity due to charge self repulsion. This specifically may lead to the brighter-fatter effect (e.g., Walter [\bibitem[Walter(2015)]{2015JInst..10C5015W} Walter, C.~W.\ 2015, *Journal of Instrumentation*, 10, C05015]).

In some cases the PSF may vary over the field of view. The simplest approach is to divide the image to smaller images in which the PSF is approximately constant. These sub-images can be as small as four times the PSF size. Since the convolution operation is local, it is straight forward to incorporate a spatially variable PSF into any subtraction method (e.g., Alard 2000, *A&AS*, 144, 363).

7.3. Interpolation

The registration step requires interpolating one of the images into a new coordinates grid. If the PSF is Nyquist sampled (band limited) then one can use the Whittaker-Shannon interpolation formula (sometimes called "sinc" interpolation) without losing information due to the interpolation process.

However, if the PSF is under-sampled, interpolation can lead to variation in the PSF shape which depends on the position of the source within the pixel (pixel phase). Such an effect may cause severe problems to any subtraction method. One simple way to deal with this problem is to add a noise term to the denominator of $S_{corr}$ (Eq. 25) that takes into account the extra noise induced by the pixel-phase dependent PSF variations.

7.4. Registration

Registration is a critical step for any image differencing technique. Any leftover registration imperfection residuals between the new and reference image can lead to improper subtraction, subtraction artifacts and eventually to false detections. Sections § 3.3 and § 3.4 discuss how registration errors, color-refraction and astrometric scintillations can be treated. However, it is still desirable to minimize any registration errors prior to subtraction.

In many cases affine transformations are not enough to map between the two images. The main reasons include: differential atmospheric refraction, differential aberration of light, and high-order optical distortions.

Usually when images are taken with the same system and the same on-sky pointing, optical distortions can not play an important role as their effect on the two images is almost identical.

Figure 11:
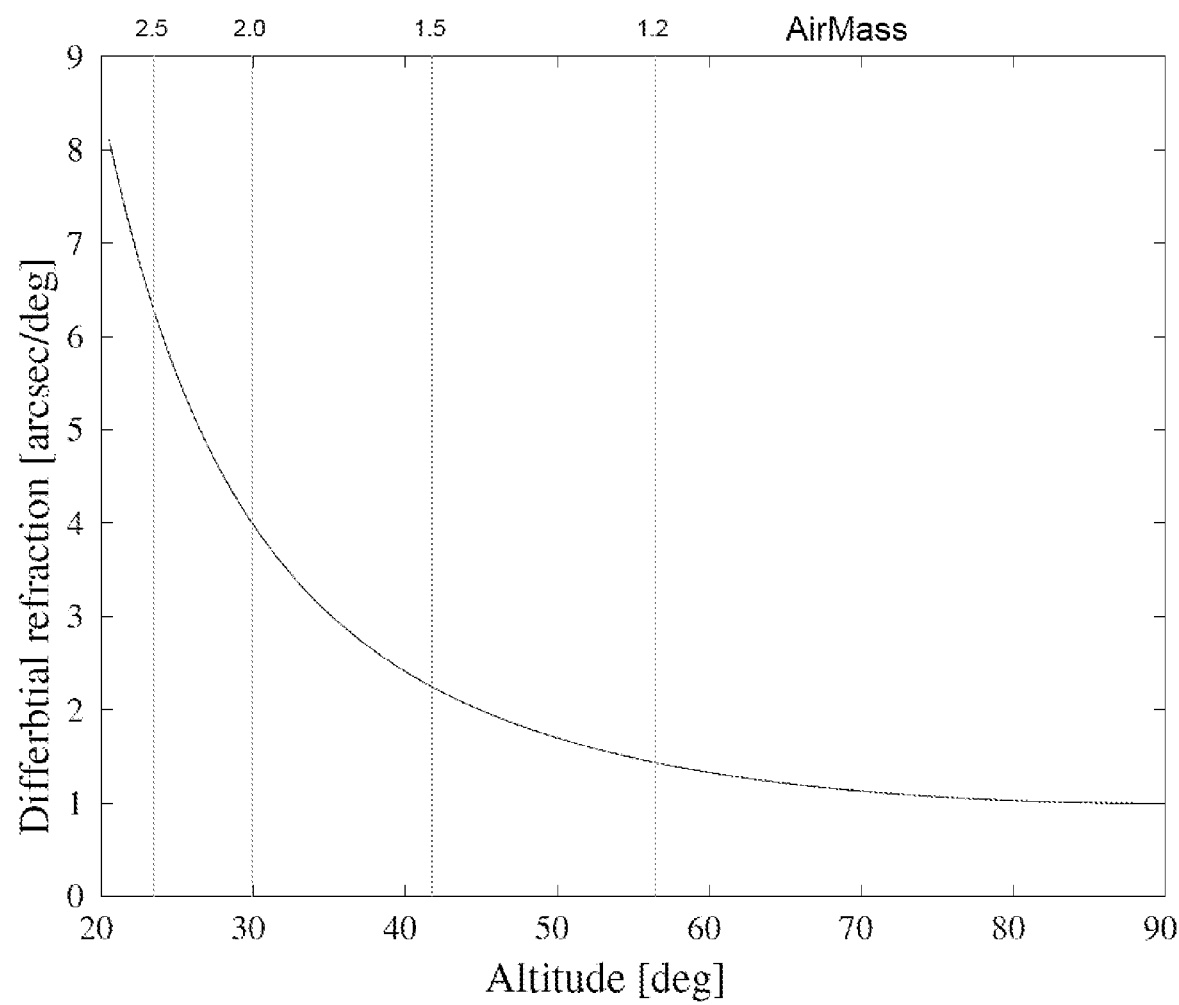
FIG. 11 conceptually demonstrates the differential atmospheric refraction (in the altitude direction)

The amplitude of differential atmospheric refraction can be as high as 8" deg$^{-1}$. FIG. 11 demonstrates the amplitude of differential atmospheric refraction, as a function of altitude, in units of arcsec per deg, calculated using the code in Ofek 2014) and formulae provided in Filippenko et al. [\bibitem[Filippenko(1982)]{1982PASP . . . 94..715F} Filippenko, A.~V.\ 1982, \pasp, 94, 715], for a wavelength of 5000 Å, temperature of 15□° C., pressure of 760 mm Hg and partial water vapor pressure of 8 mm Hg. Since the direction of the atmospheric refraction is known very well, the best way to with the distortions caused by the atmosphere is to add to the affine transformation terms that fit the atmospheric refraction amplitude with its known direction (i.e., the parallactic angle).

Unfortunately, most astrometric and registration packages do not support distortions of this form, and instead they absorb the refraction correction into high order polynomials. Furthermore, the current WCS header keywords do not support this kind of transformations.

Note that atmospheric refraction distortions are detectable even on small angular scales. For example, this effect can reach 0.1" arcmin$^{-1}$ at altitude of 20 deg. In any case, in order to minimize any higher order distortions, it is recommended to divide the image to small sections (about 10 by 10 arcmin).

The typical amplitude of differential aberration of light (due to the Earth motion) is of the order of ~0.2" deg$^{-1}$. This is small enough to be ignored in some cases. However, since the effect of aberration is fully predictable it is straightforward to incorporate it into the transformation. As far as known, popular image registration (and astrometric) packages ignore the aberration of light.

7.5. Astrometric Scintillations

Astrometric registration of ground-based imaging is typically limited by astrometric scintillation induced by the Earth atmosphere. An order of magnitude estimate for the amplitude of astrometric scintillation is:

$$\sigma_{scint} \sim \frac{FWHM}{\sqrt{t_{int}/t_{scint}}}, \tag{51}$$

where FWHM is the PSF FWHM, $t_{int}$ is the integration time, and $t_{scint}$ is the correlation time scale of the tip/tilt term of the atmospheric scintillations. For example, assuming FWHM=2", $t_{int}$=60 s, and $t_{scint}$=0.03 s, gets $\sigma_{scint}$~40 mas. This can be an order of magnitude larger than the astrometric noise induced by the Poisson noise of bright stars. In practice this noise depends on the angular scale (e.g., Shao et al. 1992, *A&A*, 262, 353).

This kind of astrometric noise is hard to remove, and therefore it is expected that bright stars may have some leftover residuals in the subtraction process. However, sections § 3.3 and § 3.4 demonstrate two methods to solve this problem.

7.6. Color Refraction

Figure 12:
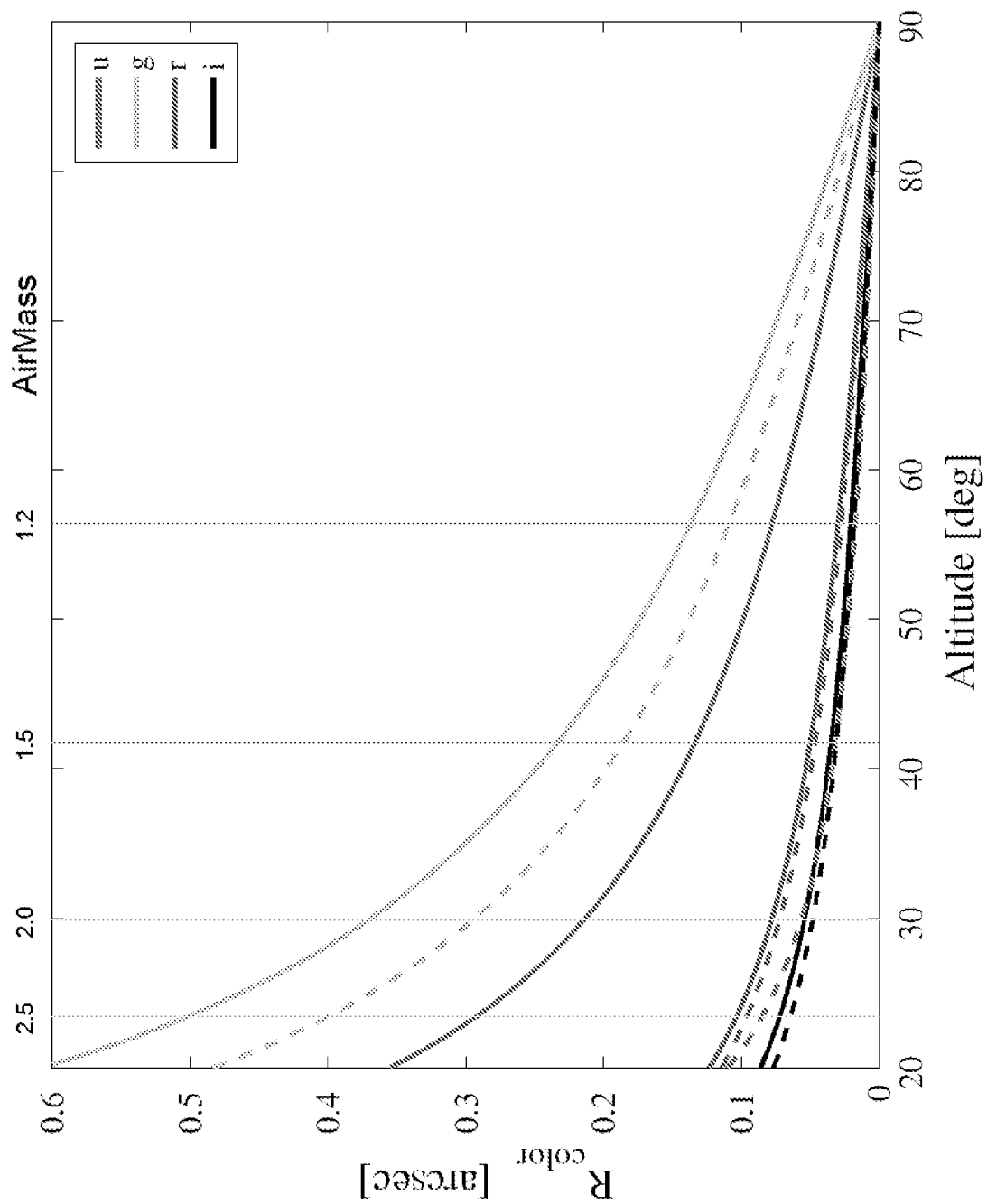
FIG. 12 conceptually demonstrates the relative amplitude of color refraction, in different bands, as a function of altitude.

The atmospheric refraction is color dependent and hence sources with different spectra can suffer different refraction at the same air-mass. FIG. 12 demonstrates the relative amplitude of color refraction, in different bands, between an O5V star and an M5V star and between an A0V star and an M5V star, as a function of altitude. Solid lines represent the difference in color refraction (in the altitude direction) in arcsec, as a function of altitude, between the O5V star and M5V star. The various colors correspond to different filters (legend). The dashed lines show the same, but for the difference between an A0V star and M5V star. The calculation includes the atmospheric extinction (at Kitt Peak), and uses stellar spectra Pickles [\bibitem[Pickles(1998)] {1998PASP..110..863P} Pickles, A.~J.\ 1998, \pasp, 110, 863]. Atmospheric conditions are the same as in FIG. 11.

Three solutions are suggested:
(1) Constructing reference images for several air-mass ranges. Since color refraction is symmetric around the meridian, one need to construct such reference images separately for observations conducted east and west of the meridian;
(2) Calculating the variance induced by this effect and introducing it as extra terms in the denominator of $S_{corr}$ (Eq. 25);
(3) Fitting the astrometric shift for each residual in D, using the scheme demonstrated in section § 3.4.
The last option is the preferred approach.

7.7. Additional Sources of Noise

There may be additional sources of noise that can influence image subtraction. An example for a rare problem is encountered in the simulations and real images, is that if a binary star has uncorrelated astrometric noise (in reality this is rare as both registration errors and astrometric scintillation noise, but not the Poisson noise, are correlated on short angular scales); this may affect the calculation of the gradient image (Eqs. 30-32; and FIGS. 7A-7F for example). In principle such problems can be accounted for in $S_{corr}$, however, one need to identify these issues. Therefore, successful implementation of this method requires large-scale tests on real data.

8. Conclusions

Current popular image subtraction methods have several important limitations, including: non-optimality, numerical instability in some cases, some of the methods use matrix inversion, which is slow to calculate. Most importantly, these methods do not provide a closed form formula for calculation of the significance of a transient candidate. Moreover, in some cases due to numerical instability of some of the methods it is not possible to calculate, even numerically, the significance of a transient candidate. This undermines any automatic transient detection and classification, and may be a considerable obstacle for future surveys.

A closed-form transient detection and image subtraction statistics are provided that potentially solve all of the above problems, and have the following properties:

1. The transient detection statistic is mathematically proven to be optimal in the background-dominated noise limit;
2. Both statistics are numerically stable for any pair of input images;
3. For accurately registered, adequately sampled images, these statistics do not leave any subtraction residuals or deconvolution artifacts;
4. It is possible to correct the transient detection statistic to be resilient to registration errors, color-refraction errors, and any noise for which a model can be constructed;
5. Credible detection significance can be assigned for newly found transients;
6. The proper subtraction image has white noise in the background-dominated-noise limit. This makes it attractive for more complex measurements and visualization;
7. The proper subtraction statistic is a sufficient statistic for any further statistical test on the difference image. In particular, it allows to distinguish particle hits and other image artifacts from real transients;
8. Both statistics are symmetric to the exchange of the new and reference images;
9. Both statistics are fast to calculate—at least an order of magnitude faster to compute than popular methods;
10. Both statistics are given in closed form and they are straightforward to implement;
11. The proper subtraction statistic allows searching for small astrometric changes between the new and reference images, even in arbitrarily crowded regions;
12. The same statistics are also optimal for flux measurements in the background-noise dominated limit;
13. It is demonstrated that the optimal way to prepare a reference image is the proper image coaddition statistic presented in Zackay & Ofek 2015b.

From the above it is concluded that the presented/demonstrated image differencing algorithm can solve most of the challenges of astronomical image subtraction.

9. Full Derivation of the Image Subtraction Statistics

Let R and N be the background subtracted reference image and background subtracted new image, respectively. Denote by T the background subtracted true constant sky image. Denote by $P_r, P_r$ and $P_n$ the point spread functions (PSFs) of the reference image and the new image, respectively. $P_r$ and $P_n$ are normalized to have unit sum.

Writing the expression for the reference image:

$$R = F_r T \otimes P_r + \varepsilon_r, \tag{52}$$

where $\varepsilon_r$ is the additive noise component of the image R. Given the null hypothesis, $H_0$, that states there are no new sources in the new image one can write:

$$N_{|H_0} = F_n T \otimes P_n + \varepsilon_n. \tag{53}$$

Given the alternative hypothesis, $H_1(q,\alpha)$, that states there is a new point source at position q with flux $\alpha$, one can write:

$$N_{|H_1(q,\alpha)} = F_n T \otimes P_n + F_n \alpha \delta(q) \otimes P_n + \varepsilon_n, \tag{54}$$

where $\delta(q)$ denotes a two dimensional image with one at position q, and zero otherwise. Assuming that the images are background subtracted, and that the dominant source of noise is the background noise, $\varepsilon_r$ and $\varepsilon_n$ both satisfy that all pairs of pixels are uncorrelated—i.e., that for all pairs of pixels $x_1, x_2$ for which $x_1 \neq x_2$:

$$\text{Cov}(\varepsilon_r[x_1], \varepsilon_r[x_2]) = 0, \text{Cov}(\varepsilon_n[x_1], \varepsilon_n[x_2]) = 0, \tag{55}$$

and that all pixels have spatially uniform variance (in practice this assumption can be relaxed):

$$V(\varepsilon_r[x]) = \sigma_r^2, V(\varepsilon_n[x]) = \sigma_n^2. \tag{56}$$

Because both hypotheses are simple, one can use the Neyman-Pearson lemma, that states the most powerful statistic for deciding between two simple hypotheses is the likelihood ratio test:

$$L(q, \alpha) = \frac{P(N, R | H_0)}{P(N, R | H_1(q, \alpha))}, \tag{57}$$

where P denotes probability. A critical point is that there are no prior information or assumptions on T. Therefore, one cannot calculate the probabilities $P(N,R|H_0)$ and $P(N,R|H_1(q,\alpha))$ directly. However, one can calculate their ratio by developing the expression using the law of conditional probabilities $$L(q, \alpha) = \frac{P(N | R, H_0) P(R | H_0)}{P(N | R, H_1(q, \alpha)) P(R | H_1(q, \alpha))}. \tag{58}$$

Using the fact that both $H_0$ and $H_1(q,\alpha)$ state the same probabilistic model for R (and therefore can assign the same likelihood for observing R) one can further simplify:

$$L(q, \alpha) = \frac{P(N | R, H_0)}{P(N | R, H_1(q, \alpha))}. \tag{59}$$

To calculate $P(N|R,H_0)$ the statistical behavior of the Fourier transforms of N and R, given both hypotheses is examined, and it is assumed that the images are background-noise dominated. Using the fact that the Fourier transform of white noise is itself white noise, the exact noise properties of the Fourier transform of both R, N given both hypotheses are known:

$$\hat{N}_{|H_0} = F_n \hat{T} \hat{P}_n + \hat{\varepsilon}_n, \tag{60}$$

$$\hat{N}_{|H_1(q,\alpha)} = F_n(\hat{T} + \alpha\delta(\hat{q}))\hat{P}_n + \hat{\varepsilon}_n, \tag{61}$$

$$\hat{R}_{|H_0} = \hat{R}_{|H_1(q,\alpha)} = F_r \hat{T} \hat{P}_r + \hat{\varepsilon}_r, \tag{62}$$

where the $\hat{\ }$ accent denotes Fourier transform and both $\hat{\varepsilon}_n$ and $\hat{\varepsilon}_r$ are complex white Gaussian noise (the noise in the Fourier transform of an image with white noise, is white except for the obvious symmetry $$\hat{\varepsilon}_n(f_1, f_2) = \overline{\hat{\varepsilon}_n(-f_1, -f_2)},$$

where over line denotes complex conjugation. This symmetry is due to the fact that the input images are real).

Using the fact that $\hat{R}$ is measured, one can invert its probabilistic model to obtain a model for T:

$$\hat{T} = \frac{\hat{R}}{F_r \hat{P}_r} - \frac{\hat{\varepsilon}_r}{F_r \hat{P}_r}. \tag{63}$$

Note that the model for $\hat{T}$ is not calculated, and can be used only as a substitution step. This step is valid if $|\hat{P}_r| \neq 0$. In practice this can be verified either by making sure that the model for $\hat{P}_r$ does not contains absolute zeros, or by adding a small number (i.e., the computer precision) to the denominator of Eq. 13.

Using this expression for $\hat{T}$, one can write a probabilistic model for N given R and $H_0$:

$$\hat{N}_{|\hat{R}} = \frac{\hat{R}}{F_r \hat{P}_r} F_n \hat{P}_n - \frac{\hat{\varepsilon}_r}{F_r \hat{P}_r} F_n \hat{P}_n + \hat{\varepsilon}_n. \tag{64}$$

Given this model for T and assuming the noise is Gaussian, one can calculate the probability to observe N (this is the $\chi^2$ up to a factor of 2):

$$\log(P[\hat{N} \mid \hat{R}, H_0]) = \sum_f \frac{-\left|\hat{N} - \frac{F_n \hat{P}_n \hat{R}}{F_r \hat{P}_r}\right|^2}{2V\left(\hat{\varepsilon}_n + \frac{F_n \hat{P}_n \hat{\varepsilon}_r}{F_r \hat{P}_r}\right)}, \tag{65}$$

Using the linearity and scalar multiplication properties of the variance and simplifying gets:

$$\log(P[\hat{N} \mid \hat{R}, H_0]) = \frac{1}{2} \sum_f \frac{-|F_r \hat{P}_r \hat{N} - F_n \hat{P}_n \hat{R}|^2}{\sigma_n^2 F_r^2 |\hat{P}_r|^2 + \sigma_r^2 F_n^2 |\hat{P}_n|^2}, \tag{66}$$

Similarly, given $H_1$:

$$\log(P[\hat{N} \mid \hat{R}, H_1(q, \alpha)]) = \tag{67}$$

$$= -\frac{1}{2} \sum_f \frac{|F_r \hat{P}_r \hat{N} - F_n \hat{P}_n \hat{R} - \alpha F_n F_r \hat{P}_n \hat{P}_r \delta(q)|^2}{\sigma_n^2 F_r^2 |\hat{P}_r|^2 + \sigma_r^2 F_n^2 |\hat{P}_n|^2}. \tag{68}$$

Because the hypothesis $H_1$ has the free parameter $\alpha$, one cannot use the Neyman-Pearson lemma directly. In order to preserve the optimality proof of the test, a test is constructed, which is uniformly most powerful with respect to a. The procedure for doing this is: Identifying a scalar sufficient statistic of the data S(q) with respect to $H_1(q,\alpha)$ for every $\alpha$. Then, showing that this statistic satisfies the requirement for the Karlin-Rubin theorem [Karlin & Rubin *Ann. Math. Statist.* 27 (1956), no. 2, 272-299], that for any $\alpha_1 > \alpha_0$, and for any value of S(q)=x, the likelihood ratio $$l(x) = \frac{P(S(q) = x \mid \alpha_1)}{P(S(q) = x \mid \alpha_0)}, \tag{69}$$

is a non-decreasing function of x. Then, it is guaranteed that the test $S(q) > \eta$ for some threshold $\eta$ that determines the false-positive rate of the test, is uniformly most powerful for the decision problem between $H_0$ and $H_1(q,\alpha)$ for any $\alpha$. To construct the statistic S(q), the parentheses of Eq. 68 are expended, using $|a+b|^2 = |a|^2 + |b|^2 + 2\Re[a\bar{b}]$, where $\Re$ is the real number operator, and removing the $|a|^2$ and $|b|^2$ terms because they do not depend on both a and the data (this is allowed by the Fisher-Neyman factorization criteria for constructing a sufficient statistic, that is demonstrated in full form in section § 13)

$$\log(L(q, \alpha)) = \tag{70}$$

$$= \sum_f \frac{\Re\left[(F_r \hat{P}_r \hat{N} - F_n \hat{P}_n \hat{R}) \overline{\alpha F_r F_n \hat{P}_n \hat{P}_r \delta(q)}\right]}{\sigma_n^2 F_r^2 |\hat{P}_r|^2 + \sigma_r^2 F_n^2 |\hat{P}_n|^2}. \tag{71}$$

Noticing that $\alpha$ enters only as a scalar multiplier to the remaining expression, one can identify the sufficient statistic S(q):

$$S(q) \equiv \frac{\log(L(q, \alpha))}{\alpha}, \tag{72}$$

The expression on Eq. 70 satisfies the monotonicity requirement for the Karlin-Rubin theorem, and therefore S(q) is uniformly most powerful with respect to testing $H_1(q,\alpha)$ for any $\alpha$, and therefore is the optimal transient detection statistic for detecting transients at position q.

In order to express the same score in term of intuitive quantities the "proper subtraction" image is defined:

$$\hat{D} = \frac{(F_r \hat{P}_r \hat{N} - F_n \hat{P}_n \hat{R})}{\sqrt{\sigma_n^2 F_r^2 |\hat{P}_r|^2 + \sigma_r^2 F_n^2 |\hat{P}_n|^2}}. \tag{73}$$

The PSF for transient detection:

$$\hat{P}_D = \frac{F_r F_n \hat{P}_r \hat{P}_n}{F_D \sqrt{\sigma_n^2 F_r^2 |\hat{P}_r|^2 + \sigma_r^2 F_n^2 |\hat{P}_n|^2}}, \tag{74}$$

and the normalization:

$$F_D = \frac{F_n F_r}{\sqrt{F_n \sigma_r^2 + F_r \sigma_n^2}}. \tag{75}$$

Note that $F_D$ can be derived by substituting 1 into $\hat{P}_n$ and $\hat{P}_r$ in the expression for $\hat{P}_D$.

In the background-noise dominated limit, D has white noise (section § 4.5). The score S(q) can be expressed by:

$$S(q) = \Re\left[F_D \sum_f \hat{D}\overline{\hat{P}_D}\hat{\delta}(q)\right]. \tag{76}$$

Expressing this in real space using the convolution theorem gets:

$$S(q)=F_D \Re [D \otimes \tilde{P}_D \otimes \tilde{\delta}](q)](0). \tag{77}$$

Noticing that both D and $P_D$ contain only real numbers, the real operator can be removed. Convolution with a delta function is just the shift operator, therefore the expression for S(q) can be simplified even further to be:

$$S(q)=[F_D D \otimes \tilde{P}_D](q). \tag{78}$$

The expression for its Fourier transform is then expressed by:

$$\hat{S} = \hat{D}\overline{\hat{P}_D} = \frac{F_n F_r^2 \overline{\hat{P}_n} |\hat{P}_r|^2 \hat{N} - F_r F_n^2 \overline{\hat{P}_r} |\hat{P}_n|^2 \hat{R}}{\sigma_r^2 F_n^2 |\hat{P}_n|^2 + \sigma_n^2 F_r^2 |\hat{P}_r|^2}. \tag{79}$$

This is the final form of the optimal transient detection statistic. An alternative form for this expression can be written as:

$$\hat{S} = \frac{F_n F_r^2 \frac{\overline{\hat{P}_n}}{\sigma_n^2} \frac{|\hat{P}_r|^2}{\sigma_r^2} \hat{N} - F_r F_n^2 \frac{\overline{\hat{P}_r}}{\sigma_r^2} \frac{|\hat{P}_n|^2}{\sigma_n^2} \hat{R}}{F_n^2 \frac{|\hat{P}_n|^2}{\sigma_n^2} + F_r^2 \frac{|\hat{P}_r|^2}{\sigma_r^2}}. \tag{80}$$

10. Construction of the Reference Image

Extending the statistical framework to the situations a set of references is given, the optimal transient detection statistic is searched for, given all of the references. Each reference image out of a total of J images is given by:

$$R_j = F_j P_j \otimes T + \varepsilon_j. \tag{81}$$

A certain new image N is measured, and it should be determined, which of the following is true, $H_0$:

$$N=F_n P_n \otimes T + \varepsilon_n, \tag{82}$$

or $H_1(q)$:

$$N=F_n P_n \otimes (T+\delta(q))+\varepsilon_n. \tag{83}$$

As in the previous section § 9, two simple hypotheses are tested. Therefore, the optimal test statistic is the log-likelihood ratio test [Neyman & Pearson]

$$L(q, \alpha) = \frac{P(N, R_1, ..., R_J | H_0)}{P(N, R_1, ..., R_J | H_1(q, \alpha))}. \tag{84}$$

As before, one can use the law of conditional probabilities, and the fact that $H_0$ and $H_1$ predict the same likelihood to all references:

$$L(q, \alpha) = \frac{P(N | R_1, ..., R_J, H_0)}{P(N | R_1, ..., R_J, H_1(q, \alpha))}. \tag{85}$$

In order to calculate the conditional probabilities, a probabilistic model for N that does not contain T is required. This could be achieved by using all references to get the best statistical model for T.

As in the previous section, this can be more easily formulated by stating the hypotheses for the images in the Fourier plane:

$$\hat{N}_{|H_0}=\hat{T}\hat{P}_n+\hat{\varepsilon}_n, \tag{86}$$

$$\hat{N}_{|H_1(q,\alpha)}=(\hat{T}+\alpha\hat{\delta}(\hat{q}))\hat{P}_n+\hat{\varepsilon}_n, \tag{87}$$

$$\hat{R}_{j|H_0}=\hat{R}_{j|H_1(q,\alpha)}=\hat{T}\hat{P}_j+\hat{\varepsilon}_j. \tag{88}$$

Following section § 9, one can continue to develop this in the long way into the correct difference image and the correct transient detection statistic. The key observation made, is that one can cast all the information in the reference images into a statistical model for $\hat{T}$. Using the result from the appendix of Zackay & Ofek 2015a, the choice that maximizes the S/N is the weighted addition of all the sources of information on $\hat{T}(f)$:

$$\hat{T} = \frac{\sum_j \frac{F_j \overline{\hat{P}_j}}{\sigma_j^2}\hat{R}_j}{\sum_j \frac{F_j^2 |\hat{P}_j|^2}{\sigma_j^2}} + \hat{\varepsilon}_T. \tag{89}$$

Where the noise contribution is denoted from all the reference images by $\hat{\varepsilon}_T$.

Calculating its variance gets:

$$V[\hat{\varepsilon}_T] = \frac{1}{\sum_j \frac{F_j^2 |\hat{P}_j|^2}{\sigma_j^2}} \equiv \frac{1}{F_r^2 |\hat{P}_r|^2}, \tag{90}$$

where it is defined:

$$F_r = \sqrt{\sum_j \frac{F_j^2}{\sigma_j^2}}, \hat{P}_r = \frac{1}{F_r}\sqrt{\sum_j \frac{F_j^2}{\sigma_j^2}|\hat{P}_j|^2}. \tag{91}$$

Given these choices and the template of Eq. 63, the formula for the coaddition of the reference images is found:

$$\hat{R} = \frac{\sum_j F_j \frac{\overline{\hat{P}_j}}{\sigma_j^2}\hat{R}_j}{\sqrt{\sum_j F_j^2 \frac{|\hat{P}_j|^2}{\sigma_j^2}}}. \tag{92}$$

Here $\hat{\sigma}_R=1$. Since R, $P_r$ and T satisfies Eq. 52, gets a single reference image that complies with the requirements of the statistical model. Interestingly, Eq. 92 is identical to the proper coaddition image presented in Zackay and Ofek (2015b; paper II in the series of coaddition).

Substituting Eq. 92 into $\hat{D}$ gets:

$$\hat{D} = \frac{\sqrt{\sum_j \frac{F_j^2 |P_j|^2}{\sigma_j^2}} \hat{N} - F_n \hat{P}_n \left( \frac{\sum_j \frac{\overline{F_j \hat{P}_j}}{\sigma_j^2} \hat{R}_j}{\sqrt{\sum_j \frac{F_j^2 |\hat{P}_j|^2}{\sigma_j^2}}} \right)}{\sqrt{\sigma_n^2 \left( \sum_j \frac{F_j^2 |P_j|^2}{\sigma_j^2} \right) + \sigma_r^2 F_n^2 |\hat{P}_n|^2}}. \tag{93}$$

Writing the source detection statistic in explicit form gets:

$$\hat{S} = \frac{\frac{F_n \overline{\hat{P}_n}}{\sigma_n^2} \left( \sum_j \frac{F_j^2 |\hat{P}_j|^2}{\sigma_j^2} \right) \hat{N} - \frac{F_n^2 |\hat{P}_n|^2}{\sigma_n^2} \left( \sum_j \frac{\overline{F_j \hat{P}_j} \hat{R}_j}{\sigma_j^2} \right)}{\frac{F_n^2 |\hat{P}_n|^2}{\sigma_n^2} + \left( \sum_j \frac{F_j^2 |\hat{P}_j|^2}{\sigma_j^2} \right)}. \tag{94}$$

An optimal solution is resulted with a closed formula for optimal transient detection, given a set of references. Note that there are other choices that can be used instead of R. However, the proper coaddition image is preferred, due to its uncorrelated noise (Zackay & Ofek 2015b). Finally, also N can be composed of multiple images. In this case, the optimal solution for the subtraction is to perform the optimal transient detection with both N and R being the proper coaddition of all the images in their corresponding sets.

11. Correction for Source Noise of Bright Objects

The assumption that the noise distribution is independent of position, and of the true image itself, is of course not true. Specifically, near bright stars the dominant source of noise is the Poisson fluctuations of the source itself, which is obviously position dependent. Therefore, in the vicinity of bright sources the variance is underestimated, and random fluctuations in the noise can cause false transient detections in these positions. Since only a negligible part of the sky behaves in such a way, it is not wished to change the statistic S in places away from bright sources.

Therefore, the recommended is the following: Calculating separately the two parts of Eq. 94:

$$\hat{S_N} = \frac{\frac{F_n \overline{\hat{P}_n}}{\sigma_n^2} \left( \sum_j \frac{F_j^2 |\hat{P}_j|^2}{\sigma_j^2} \right)}{\frac{F_n^2 |\hat{P}_n|^2}{\sigma_n^2} + \left( \sum_j \frac{F_j^2 |\hat{P}_j|^2}{\sigma_j^2} \right)} \hat{N} \equiv \hat{k}_n \hat{N}, \tag{95}$$

and $$\hat{S_{R_j}} = \frac{\frac{F_n^2 |\hat{P}_n|^2}{\sigma_n^2} \frac{\overline{F_j \hat{P}_j}}{\sigma_j^2}}{\frac{F_n^2 |\hat{P}_n|^2}{\sigma_n^2} + \left( \sum_j \frac{F_j^2 |\hat{P}_j|^2}{\sigma_j^2} \right)} \hat{R}_j \equiv \hat{k}_j \hat{R}_j. \tag{96}$$

Next, applying inverse Fourier transform to get to the image domain:

$$S = S_N - \sum_j S_{R_j}. \tag{97}$$

Then calculating the corrected score for the existence of transient sources:

$$S_{corr} = \frac{S_N - \sum_j S_{R_j}}{\sqrt{V(S_N) + \sum_j V(S_{R_j})}}, \tag{98}$$

where $V(S_N)$ and $V(S_{R_j})$ are the variance maps of $S_N$ and $S_{R_j}$. Essentially, these can be computed analytically by following all the operations done on $R_j$ and N, and applying the corresponding corrections to $V(S_{R_j})$ and $V(S_N)$ respectively.

Using the fact that for a zero expectancy noise source $\varepsilon$, $$V(\varepsilon \otimes P) = V(\varepsilon) \otimes (P^2). \tag{99}$$

a closed formula solution is derived for $V(S_N)$ and $V(S_{R_j})$:

$$V(S_N) = V(\varepsilon_n) \otimes (k_n^2), \tag{100}$$

$$V(S_{R_j}) = V(\varepsilon_j) \otimes (k_j^2), \tag{101}$$

where $k_n$ and $k_j$ are defined in Eqs. 95 and 96, respectively. Note that the squaring of the convolution kernel happens in the image domain.

In the presence of bright stars the noise is correlated, one need to store, or sum up the individual $V(S_{R_j})$. Using the proper coaddition image and its effective $k_r$ can not recover all the information. However, using R and $k_r$ may serve as an approximation to this process.

The proposed correction (Eq. 98) does not change the score image away from bright sources (other than move the detection statistic to units of standard deviations). The reason for this is that the variance map is spatially uniform in places away from strong sources. Note that this correction is sub-optimal near bright sources, but at least it is a score with known statistical properties, that one can use to prevent false positives and to retain some sensitivity.

This method of correcting S by the variance can be extended to any additional sources of noise, for which one can construct a model. For example, in section § 3.3 the variance due to astrometric errors is demonstrated.

12. Optimal PSF Photometry of Transient Point Sources

In general, in the statistical community, there is no consensus on how to derive the best measurement. Therefore, in this section, a measurement statistic is searched that is unbiased and has maximal S/N, and is a linear function of the input images. The resulting statistics is simply S (Eq. 12) normalized by some factor. This analysis also demonstrates another formalism, in which the transient detection statistic is optimal—it is the maximum S/N linear statistic composed out of R and N that cancels the constant in time image T. As a side comment, note that the same solution arises, when calculating the maximum likelihood estimator by maximizing Eq. 68 with respect to a.

Start by stating again the statistical model:

$$R = P_r \otimes T + \varepsilon_r, \quad (102)$$

$$N = P_n \otimes (T + \alpha \delta(q)) + \varepsilon_n, \quad (103)$$

where $\alpha$ is the flux of the new source at position q, and $\delta(q)$ is an image with 0 everywhere except position q where it's value is 1. Continuing to work under the assumption that the background noise is the most significant source of noise, this allows:

$$V[\varepsilon_r] = \sigma_r^2, \quad V[\varepsilon_n] = \sigma_n^2. \quad (104)$$

the searched statistic is written, in its most general linear form:

$$C = k_n \otimes N + k_r \otimes R, \quad (105)$$

where $k_n$ and $k_r$ are some kernels, and require:

$$F_n k_n \otimes P_n = -F_r k_r \otimes P_r. \quad (106)$$

Writing C in Fourier space gets:

$$\hat{C} = \hat{k}_n \hat{N} + \hat{k}_r \hat{R} = \alpha \delta(\hat{q}) F_n \hat{P}_n \hat{k}_n + \hat{\varepsilon}_c, \quad (107)$$

where $\varepsilon_c$ absorbs all noise sources in both images.

Here, using a well-known result (*Appendix B* Zackay & Ofek 2015a) that the maximal S/N measurement of a parameter $\theta$ given a set of statistics $X_j$ such that:

$$X_j = \mu_j \theta + \varepsilon_j, \quad (108)$$

where $\mu_j$ are scaling factors and $\varepsilon_j$ has variance $V[\varepsilon_j] = \sigma_j$, is:

$$\tilde{\theta} = \frac{\sum_j \frac{\overline{\mu_j}}{\sigma_j^2} X_j}{\sum_j \frac{|\mu_j|^2}{\sigma_j^2}}. \quad (109)$$

In this case $\mu = \delta(\hat{q}) F_n \hat{P}_n \hat{k}_n$. Applying this to $\hat{C}$, gets the maximum S/N statistic for $\alpha$:

$$\tilde{\alpha} = \frac{\sum_f \frac{\overline{\delta(q) F_n \hat{P}_n \hat{k}_n} \hat{C}}{\sigma_r^2 |\hat{k}_r|^2 + \sigma_n^2 |\hat{k}_n|^2}}{\sum_f \frac{|\delta(q) F_n \hat{P}_n \hat{k}_n|^2}{\sigma_r^2 |\hat{k}_r|^2 + \sigma_n^2 |\hat{k}_n|^2}}, \quad (110)$$

substituting $\hat{C} = \hat{k}_n \hat{N} + \hat{k}_r \hat{R}$, and $$\hat{k}_r = -\hat{k}_n \frac{F_n \hat{P}_n}{F_r \hat{P}_r}, \quad (111)$$

and simplifying (notice the cancellation of $k_n$ in the ratio, and the use of $|\delta(\hat{q})| = 1$) gets:

$$\tilde{\alpha} = \frac{\sum_f \frac{\overline{\delta(q) F_n \hat{P}_n \hat{k}_n} (\hat{k}_n \hat{N} + \hat{k}_r \hat{R})}{\sigma_r^2 |\hat{k}_r|^2 + \sigma_n^2 |\hat{k}_n|^2}}{\sum_f \frac{|\delta(q) F_n \hat{P}_n \hat{k}_n|^2}{\sigma_r^2 |\hat{k}_r|^2 + \sigma_n^2 |\hat{k}_n|^2}} = \frac{\sum_f \frac{\overline{\delta(q) F_n \hat{P}_n} \left(\hat{N} - \frac{F_n \hat{P}_n}{F_r \hat{P}_r} \hat{R}\right)}{\sigma_r^2 \left|\frac{F_n \hat{P}_n}{F_r \hat{P}_r}\right|^2 + \sigma_n^2}}{\sum_f \frac{F_n^2 |\hat{P}_n|^2}{\sigma_r^2 \left|\frac{F_n \hat{P}_n}{F_r \hat{P}_r}\right|^2 + \sigma_n^2}}, \quad (112)$$

$$\tilde{\alpha} = \frac{\sum_f \frac{\overline{\delta(q)} \left(F_r^2 F_n |\hat{P}_r|^2 \overline{\hat{P}_n} \hat{N} - F_n^2 F_r |\hat{P}_n|^2 \overline{\hat{P}_r} \hat{R}\right)}{\sigma_r^2 F_n^2 |\hat{P}_n|^2 + \sigma_n^2 F_r^2 |\hat{P}_r|^2}}{\sum_f \frac{F_n^2 F_r^2 |\hat{P}_n|^2 |\hat{P}_r|^2}{\sigma_r^2 F_n^2 |\hat{P}_n|^2 + \sigma_n^2 F_r^2 |\hat{P}_r|^2}}. \quad (113)$$

Last, one can calculate all the fluxes for all the transient sources simultaneously, by noticing that the numerator in the expression for $\tilde{\alpha}$ is the q'th position in the previously defined transient detection image S (Eq. 79). That is:

$$\tilde{\alpha} = \frac{S}{\sum_f \frac{F_n^2 F_r^2 |\hat{P}_n|^2 |\hat{P}_r|^2}{\sigma_r^2 F_n^2 |\hat{P}_n|^2 + \sigma_n^2 F_r^2 |\hat{P}_r|^2}}. \quad (114)$$

This means that the same statistic can be computed both for detection and measurement. Therefore, in order to get a flux measurement from S, all that is needed is to normalize it by $F_S$—the denominator of Eq. 114:

$$F_S = \sum_f \frac{F_n^2 F_r^2 |\hat{P}_n|^2 |\hat{P}_r|^2}{\sigma_r^2 F_n^2 |\hat{P}_n|^2 + \sigma_n^2 F_r^2 |\hat{P}_r|^2}. \quad (115)$$

Via the same process as for the detection, the standard deviation of the flux measurement S at position q can be estimated via inspection of $S_N$ and $S_R$. It is found that the standard deviation of F can be calculated by:

$$\sigma_{\tilde{\alpha}} = \frac{\sqrt{V(S_N) + V(S_R)}}{F_S}. \quad (116)$$

If the reference image is constructed from many reference images than $$V(S_R) = \sum_j V(S_{R_j}). \quad (117)$$

Note that Eq. 116 is valid for both faint (i.e., in background-dominated-noise areas) and bright transients (source-dominated-noise areas). Further note that Eq. 114 is equivalent to PSF photometry as each pixel is weighted by the appropriate value of the PSF.

13. D, $P_D$, $F_D$ are Sufficient for any Statistical Measurement or Decision on the Difference Between the Images In order to show that D, $P_D$, $F_D$ are sufficient statistics, one can use the Fisher-Neyman factorization theorem. This theorem states that: If the probability density function is $P_\theta(X)$, then T is sufficient for the parameter $\theta$ if, and only if, nonnegative functions g and h can be found such that $$P_\theta(X) = h(X) g_\theta(T(X)). \quad (118)$$

In this case, for any generative model $A_n(\theta)$ for the difference between the images, with parameter $\theta$, the probability of observing the data (R and N) factorizes into:

$$P(R, N + A_n(\theta)) = P(D|A_n(\theta)) g(R, N). \quad (119)$$

This can prove that D is a sufficient statistics.

Note that the meaning of sufficient statistics is profound—it means that any measurement or decision performed on D can return the same numerical value as if it was performed using all the data. Examples for such measurements or decisions are: arbitrary shape measurements, or identifying particle hits.

It is shown that D, along with $P_D$, $P_{D_N}$, $P_{D_R}$, are together sufficient for any likelihood calculation (up to some multiplicative, model independent factor, as allowed from the Fisher-Neyman criterion) for any instance of a generative model for $A_n(\theta)$, regardless of the constant-in-time image T. Stating the family of statistical models $A_n(\theta, q)$, for which D is to be sufficient to:

$$R = F_r T \otimes P_r + \varepsilon_r, \tag{120}$$

$$N = F_n T \otimes P_n + A_n(\theta) \otimes \delta(q) + \varepsilon_n, \tag{121}$$

where $A_n(\theta)$ is the change made in the new image, located in position q, and T is the constant-in-time (unknown) image. Note that $A_n(\theta)$ is not convoluted with the PSF of the images, as this can allow us to deal with signal that was not convolved by the PSF (e.g., "bad" pixels, small astrometric shifts). However, such a PSF can be included in $A_n(\theta)$.

Using the law of conditional probability, the probability is:

$$P(R, N \mid A_n(\theta)) = P(N \mid R, A_n(\theta)) P(R \mid A_n(\theta)) \tag{122}$$

$$= P(N \mid R, A_n(\theta)) P(R). \tag{123}$$

Since the probability of R is independent of the model parameter $\theta$ (as it only influences the model for N), it suffices for us to calculate $\log(P(N|R, A_n(\theta)))$. As in the previous sections, one can project the knowledge of R to a statistical model for T:

$$\hat{T} = \frac{\hat{R}}{F_r \hat{P}_r} - \frac{\hat{\varepsilon}_r}{F_r \hat{P}_r} \equiv \frac{\hat{R}}{F_r \hat{P}_r} + \hat{\varepsilon}_T. \tag{124}$$

Using it calculating the probability of observing N given $A_n(\theta)$:

$$-\log(P(N \mid R, A_n(\theta))) = \sum_f \frac{\|\hat{N} - F_n \hat{P}_n \hat{T} - A_n(\theta) \hat{\delta(q)}\|^2}{2V[\hat{\varepsilon}_n + F_n \hat{P}_n \hat{\varepsilon}_T]}. \tag{125}$$

Opening the absolute value, gets the summation of three terms. The first term, $$\sum_f \frac{\|\hat{N} - F_n \hat{P}_n \hat{T}\|^2}{2V[\hat{\varepsilon}_n + F_n \hat{P}_n \hat{\varepsilon}_T]},$$

does not depend on $A_n(\theta)$ and therefore can be removed (can be absorbed in the Fisher-Neyman h). The second term is:

$$\sum_f 2\Re\left[ \frac{(\hat{N} - F_n \hat{P}_n \hat{T}) \overline{A_n(\theta) \hat{\delta(q)}}}{2V[\hat{\varepsilon}_n + F_n \hat{P}_n \hat{\varepsilon}_T]} \right] = \ldots = \tag{126}$$

$$= \frac{(F_r^2 |\hat{P}_r|^2 \hat{N} - F_n F_r \hat{P}_n \overline{\hat{P}_r} \hat{R}) \overline{A_n(\theta)}}{\sigma_n^2 F_r^2 |\hat{P}_r|^2 + \sigma_r^2 F_n^2 |\hat{P}_n|^2}. \tag{127}$$

In the last expression one can identify a matched filter operation between the proper subtraction image D $$\hat{D} = \frac{(F_r \hat{P}_r \hat{N} - F_n \hat{P}_n \hat{R})}{\sqrt{\sigma_n^2 F_r^2 |\hat{P}_r|^2 + \sigma_r^2 F_n^2 |\hat{P}_n|^2}}, \tag{128}$$

and the PSF for delta function in N (the PSF of $A_n$):

$$\hat{P_{D_N}} = \frac{F_r \hat{P}_r}{F_{D_N} \sqrt{\sigma_n^2 F_r^2 |\hat{P}_r|^2 + \sigma_r^2 F_n^2 |\hat{P}_n|^2}}, \tag{129}$$

with the zero-point:

$$F_{D_N} = \frac{F_r}{\sqrt{\sigma_n^2 F_r^2 + \sigma_r^2 F_n^2}}. \tag{130}$$

Finally, it is shown that the third term in Eq. 125 can be calculated only using D and its set of PSFs and zero-points.

$$\sum_f \frac{|A_n(\theta)|^2}{V[\hat{\varepsilon}_n + F_n \hat{P}_n \hat{\varepsilon}_T]} = \frac{F_r^2 |\hat{P}_r|^2 |\hat{A_n(\theta)}|^2}{\sigma_n^2 F_r^2 |\hat{P}_r|^2 + \sigma_r^2 F_n^2 |\hat{P}_n|^2} \tag{131}$$

$$= F_{D_N}^2 |\hat{A_n(\theta)}|^2 |\hat{P_{D_N}}|^2. \tag{132}$$

Symmetrically, every statistical change in R can be calculated in the same fashion using D and $P_{D_R}$.

$$\hat{P_{D_R}} = \frac{F_n \hat{P}_n}{F_{D_R} \sqrt{\sigma_n^2 F_r^2 |\hat{P}_r|^2 + \sigma_r^2 F_n^2 |\hat{P}_n|^2}}, \tag{133}$$

with the zero-point $$F_{D_R} = \frac{F_n}{\sqrt{\sigma_n^2 F_r^2 + \sigma_r^2 F_n^2}}. \tag{134}$$

A change in either N or R, that experiences the same PSF (and transparency) as the true image (e.g., a supernovae, variable star or small solar system body) can have the effective PSF $P_D$, and zero-point $F_D$.

This analysis means that the subtraction product D, is the optimal statistics for any, even yet unspecified, measurement or hypothesis testing required to perform on the data.

It is understood that various other modifications can be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

The invention claimed is:

1. A method for processing at least two M-dimensional data-measurements (DMs) of a physical-property for detecting one or more new-objects and/or a transition of one or more known-objects, in complex constant-background DMs, using at least one processor and at least one memory element, the method comprising:
   generating a filtered-new-DM by match-filtering a new-DM, respective to impulse response of a reference-DM;
   generating a filtered-reference-DM by match-filtering the reference-DM, respective to impulse response of the new-DM;
   generating an M-dimensional object-indicator (OI) by subtracting the filtered-reference-DM from the filtered-new-DM, or vice versa; and
   generating an M-dimensional data score (DS) from the M-dimensional OI, where each of the scores is a probe for existence of an object, at a specific M-dimensional location;
   wherein, the generating of the DS further comprises multiplying each frequency, of the OI or of the normalized-OI by its conjugated frequency-response divided by the frequency's noise-variance; thereby each frequency of the DS has a frequency-response which is equal to its noise-variance.

2. The method according to claim 1, wherein the generating of the DS further comprises normalizing spatial or temporal frequencies of the physical property within the OI, wherein each of the frequencies is normalized by standard deviation (STD) of its own noise; thereby resolution components of the normalized-OI are having physical-property noise of equal variance and further wherein the physical-property noise is uncorrelated between the resolution components.

3. The method according to claim 1, further comprises measuring the physical-property at the normalized-OI and/or at the DS.

4. The method according to claim 1, further comprises detecting at least one new object and/or a transition for at least one known-object at the normalized-OI and/or at the DS.

5. The method according to claim 4, wherein the detecting is responsive to positive and/or negative predetermined thresholds for the physical property.

6. The method according to claim 1, further comprises generating the reference-DM by accumulating plurality of match-filtered original-reference-DMs and/or generating the new-DM by accumulating plurality of match-filtered original-new-DMs, wherein the filtering is respective to each of their impulse responses.

7. The method according to claim 6, wherein the accumulating further comprises at least one selected from the group consisting of: combining, coadding, and superpositioning.

8. The method according to claim 4, wherein the reference-DM and the new-DM:
   a. cover same field of measuring,
   b. are measured by same measuring device, and
   c. are having different PSF—due to deformation of the object between their measurements.

9. The method according to claim 4, wherein at least one of the following holds true:
   all of the DMs are of same field of measuring;
   each of the DMs is acquired at a single timestamp;
   M is a positive integer;
   the reference-DM and the new-DM, are each measured by a different measuring device;
   the reference-DM and the new-DM are each measuring a different physical property;
   the reference-DM and the new-DM cover same field of measuring, measured simultaneously or at different time steps, wherein each is measured at different a wavelength;
   the method further comprises convolving the normalized-OI with a movement detection kernel;
   the method further comprises normalizing the DS using a registration noise correction;
   the method further comprises normalizing the DS using a source noise correction;
   the physical-property is flux, the DMs are images, and the resolution components are pixels;
   the physical-property is voltage and the DMs are radio signals;
   the physical-property is opacity and the DMs are tomographic measurements.

10. A computer system having at least one processor and at least one memory element, the system configured to process at least two M-dimensional data-measurements (DMs) of a physical-property for detecting one or more new-objects and/or a transition of one or more known-objects, in complex constant-background DMs, the system comprising:
    a filtering-module, stored in the memory, configured:
    to generate a filtered-new-DM by match-filtering a new-DM, respective to impulse response of a reference-DM; and
    to generate a filtered-reference-DM by match-filtering the reference-DM, respective to impulse response of the new-DM;
    a processing-module, stored in the memory, configured to generate an M-dimensional object-indicator (OI) by subtracting the filtered-reference-DM from the filtered-new-DM, or vice versa; and
    to generate an M-dimensional data score (DS) from the NI-dimensional OI, where each of the scores is a probe for existence of an object at a specific M-dimensional location;
    wherein the processing-module further configured to multiply each frequency, of the OI or of the normalized-OI, by its conjugated frequency-response divided by the frequency's noise-variance; thereby each frequency of the DS has a frequency-response which is equal to its noise-variance.

11. The system according to claim 10, wherein the processing-module further configured to generate an NI-dimensional normalized-OI, by normalizing spatial or temporal frequencies of the physical property within the OI, wherein each of the frequencies is normalized by standard deviation (STD) of its own noise; thereby resolution components of the normalized-OI are having physical-property noise of equal variance and further wherein the physical-property noise is uncorrelated between the resolution components.

12. The system according to claim 10, further comprises a measuring-module, stored in the memory, configured to measure the physical-property at the normalized-OI and/or at the DS.

13. The system according to claim 10, further comprises a detecting-module, stored in the memory, configured to detect at least one new object and/or a transition for at least one known-object at the normalized-OI and/or at the DS.

14. The system according to claim 13, wherein the detecting is responsive to positive and/or negative predetermined thresholds for the physical property.

15. The system according to claim 10, further comprises an accumulating-module, stored in the memory, configured to generate the reference-DM by accumulating plurality of match-filtered original-reference-DMs and/or to generate the new-DM by accumulating plurality of match-filtered original-new-DMs, wherein the match-filtering is respective to each of their impulse responses.

16. The system according to claim 15, wherein the accumulating further comprises at least one selected from the group consisting of: combining, coadding, and superpositioning.

17. A method for processing at least two M-dimensional data-measurements (DMs), using at least one processor and at least one memory element, the method comprising:
    generating a filtered-first-DM by match-filtering a first-DM, respective to impulse response of a second-DM;
    generating a filtered-second-DM by match-filtering the second-IBM, respective to impulse response of the first-DM;
    generating an M-dimensional third-DM by subtracting the filtered-second-DM from the filtered-first-DM, or vice versa; and
    generating an M-dimensional normalized-DM by normalizing spatial or temporal frequencies of the physical property within the third-DM, wherein each of the frequencies is normalized by standard deviation (STD) of its own noise;
    thereby resolution components of the normalized-DM are having physical-property noise of equal variance and further wherein the physical-property noise is uncorrelated between the resolution components;
    and wherein the method further comprises generating an M-dimensional data score (DS), where each of the scores is a probe for existence of an object at a specific M-dimensional location; the DS generated by multiplying each frequency, of the normalized-DM, by its conjugated frequency-response divided by the frequency's noise-variance; thereby each frequency of the DS has a frequency-response which is equal to its noise-variance.

\* \* \* \* \*